(12) United States Patent
Inaguma

(10) Patent No.: US 7,428,776 B2
(45) Date of Patent: Sep. 30, 2008

(54) METHOD OF MANUFACTURING A MAGNETIC HEAD

(75) Inventor: Teruo Inaguma, Miyagi (JP)

(73) Assignee: Sony Corporation, Tokyo (JP)

( * ) Notice: Subject to any disclaimer, the term of this patent is extended or adjusted under 35 U.S.C. 154(b) by 380 days.

(21) Appl. No.: 10/737,566

(22) Filed: Dec. 16, 2003

(65) Prior Publication Data

US 2004/0123449 A1     Jul. 1, 2004

Related U.S. Application Data

(62) Division of application No. 10/145,507, filed on May 14, 2002, now abandoned.

(30) Foreign Application Priority Data

May 21, 2001   (JP)   ............................. P2001-150249

(51) Int. Cl.
*G11B 5/17*   (2006.01)
*H05K 3/06*   (2006.01)

(52) U.S. Cl. .............. 29/603.24; 29/603.23; 29/603.12; 29/847; 360/123.38; 360/123.15

(58) Field of Classification Search .............. 29/603.25, 29/603.07, 603.23, 603.24, 603.12, 847, 29/606; 360/123, 122, 125, 123.38, 123.39, 360/123.56, 123.57, 123.15

See application file for complete search history.

(56) References Cited

U.S. PATENT DOCUMENTS 4,416,056 A * 11/1983 Takahashi ............ 29/603.25 X
6,191,916 B1 * 2/2001 Sasaki .................... 360/123 X

FOREIGN PATENT DOCUMENTS

JP       5-73843      *  3/1993

* cited by examiner

*Primary Examiner*—A. Dexter Tugbang
(74) *Attorney, Agent, or Firm*—Sonnenschein Nath & Rosenthal LLP

(57) ABSTRACT

A method of manufacturing a thin-film coil in which a first coil and a second coil each having a desired number of winding are electrically connected in series and the second coil is formed between winding portions of the first coil on substantially the same plane, comprising: forming the first coil having a predetermined number of windings via a first insulating film; forming a second insulating film on a surface of the first coil and between the winding portions of the first coil; forming an underlying conductive film on the second insulating film, and treating the underlying conductive film so as to leave only the bottom portions of the underlying conducting film between the winding portions of the first coil; and growing deposition originating from a remaing portion of the underlying conductive film on the bottom portions of the underlying conducting film between the winding portions of the first coil so as to form the second coil.

10 Claims, 39 Drawing Sheets

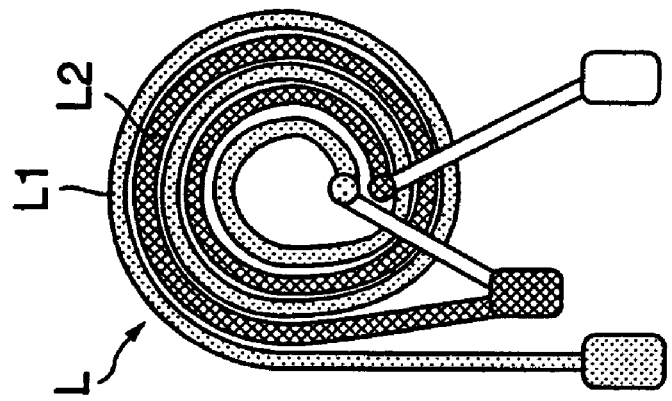
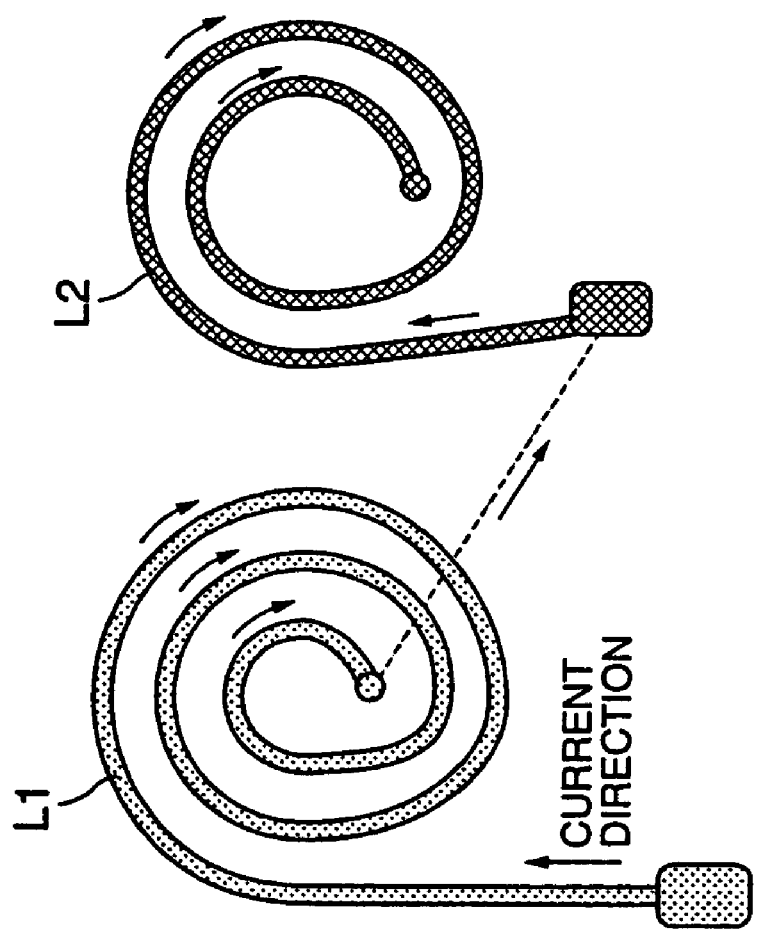

11

14

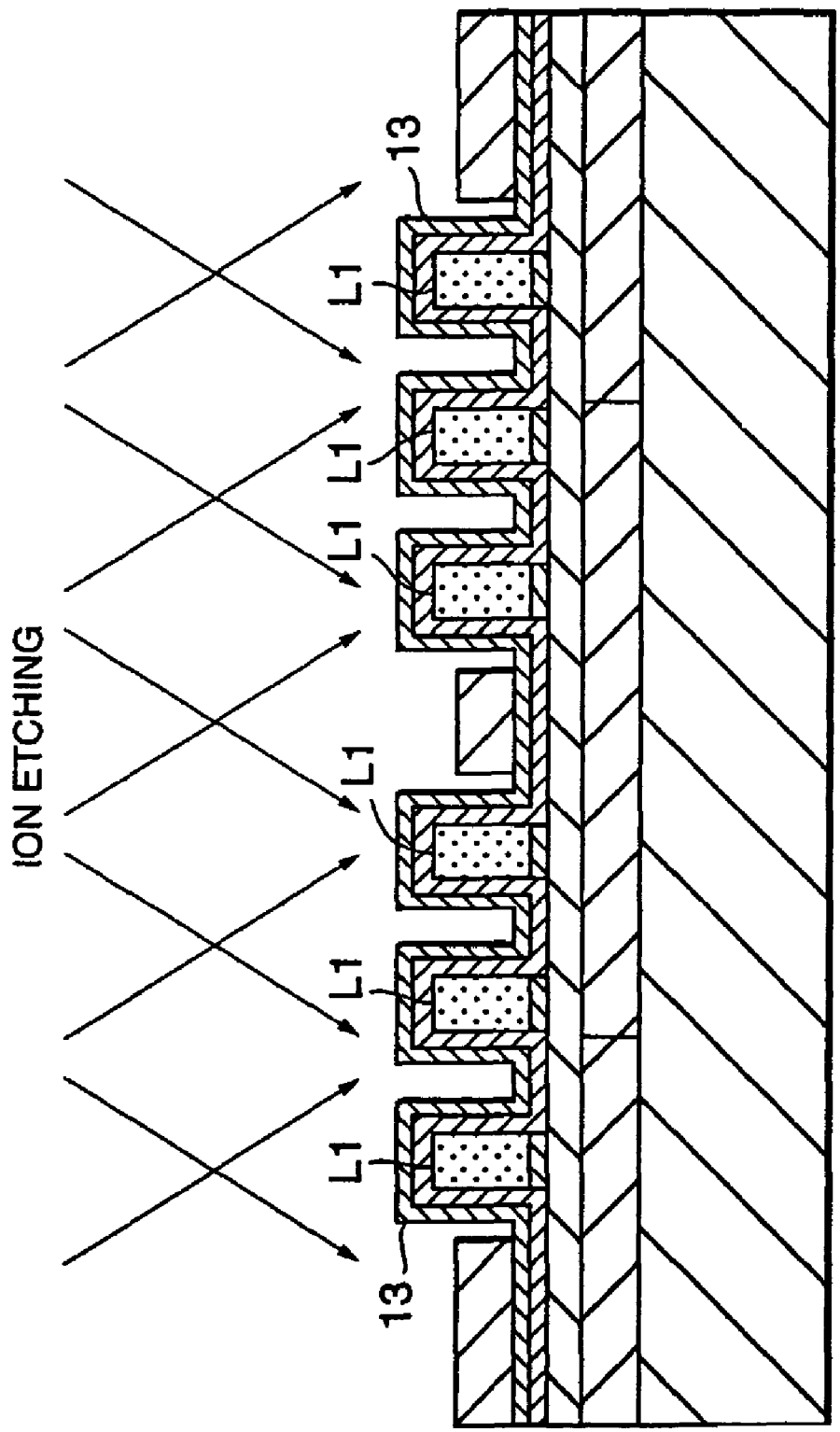

15

L1    15

L2

L2

18

BACK-GAP PORTION OPENING

BACK-GAP PORTION OPENING

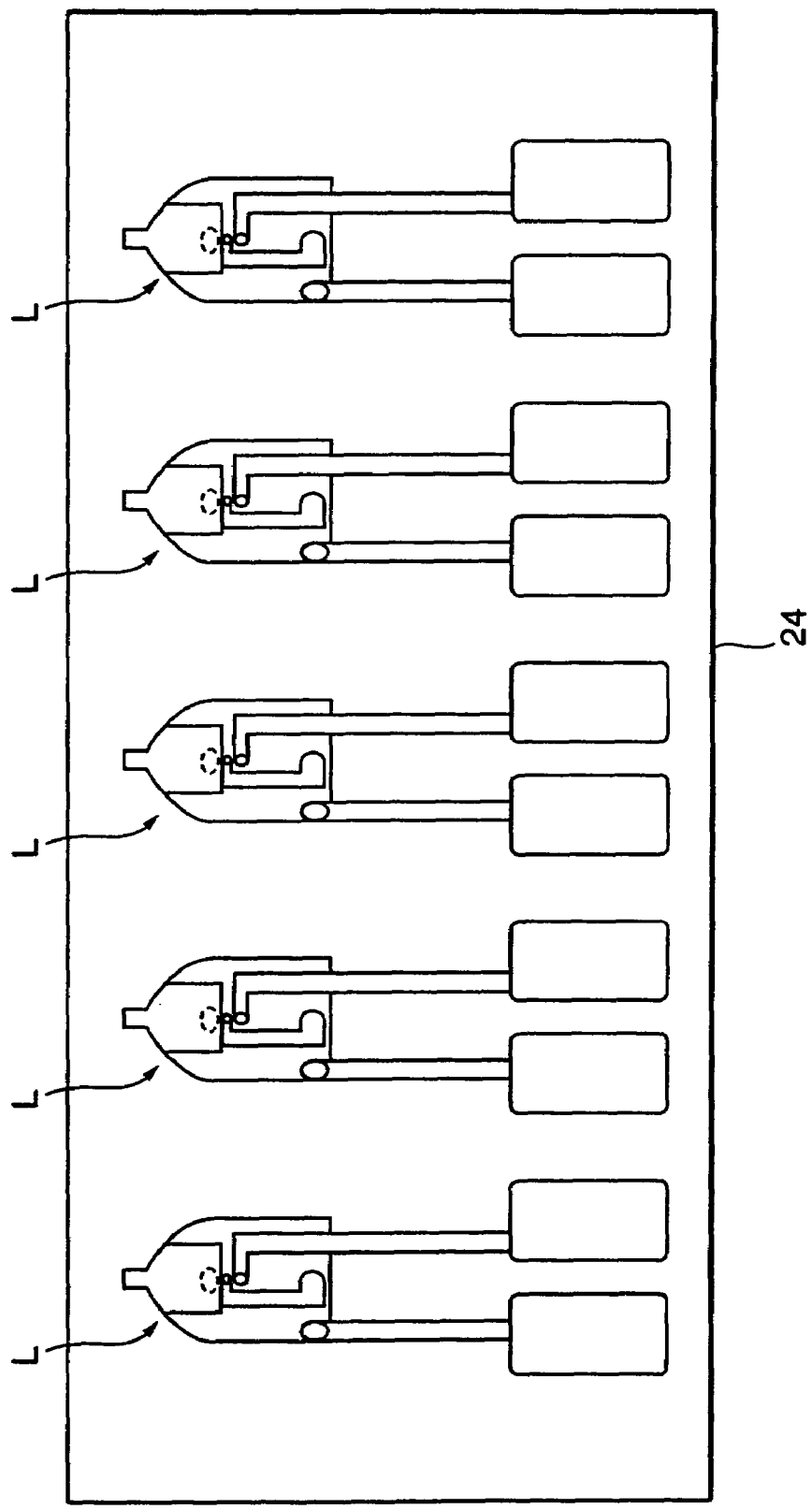

TWO-LAYERED

UPPER-LAYER COIL

LOWER-LAYER COIL

CURRENT DIRECTIONS

METHOD OF MANUFACTURING A MAGNETIC HEAD

CROSS REFERENCES TO RELATED APPLICATIONS

The present application claims priority to Japanese Application No. P2001-150249 filed May 21, 2001, and is a divisional of U.S. application Ser. No. 10/145,507 filed May 14, 2002 now abandoned, both of which are incorporated herein by reference to the extent permitted by law.

BACKGROUND OF THE INVENTION

1. Field of the Invention

This invention relates to a thin-film coil having a first coil and a second coil which are combined with each other, a magnetic head using the thin-film coil, a method of manufacturing the thin-film coil, and a method of manufacturing the magnetic head.

2. Description of Related Art

In these years, in view of high recording density of a magnetic recording medium, there is a need for improved characteristics of a magnetic head for recording on/reproducing from a magnetic recording medium. As an example of such a magnetic head, a composite thin-film magnetic head is often used which includes a recording head having an inductive type magnetic transducer for writing and a reproducing head having a magneto-resistive effect element for reading.

In such a thin-film magnetic head and a thin-film inductor, a coil is formed so as to generate a magneto-motive force. The coil is formed by means of a photolithographic process used for fabrication of semiconductor devices.

A coil formed by the process is generally referred to hereinafter as a thin-film coil. In a conventional method of forming a thin-film coil, a resist-film pattern P is formed in the shape of a coil as shown in FIG. 42A, a conductive film is then formed by plating and sputtering so as to obtain a thin-film coil L' of a conductive film, as shown in FIG. 42B. In this case, a shape and a space between winding portions are defined by patterning accuracy of the resist-film.

The patterning accuracy of the resist-film depends on conditions such as resist-film materials and performance of fabricating apparatuses including applicators, exposing devices, and developing devices, for example. Some apparatuses used in semiconductor fabrication may provide a line-space less than or equal to 1 μm.

Unlike a thickness of a few nm in semiconductor devices, a thickness of a thin-film coil of a magnetic head and a thickness of a coil used in a thin-film inductor for a variety of converters are in a range of a few μm to 10's μm. It is very difficult to form a line-space less than or equal to 1 μm by using a resist film which is applicable to such a thick conductive film.

As shown in FIGS. 43A and 43B, two coils (an upper coil and a lower coil) are stacked or two-layered so that terminals thereof may be electrically connected to form a thin-film coil. Its thickness, however, increases and the thin-film coil may not meet miniaturization requirements.

Further, in a case where a width of a magnetic head is defined in response to requirements for high recording density on a magnetic recording medium and a width of winding portions of a thin-film coil is required to be within a predetermined value, the thin-film coil formed to have a width within the value is also required to be no more than a predetermined resistance. Accordingly, the thin-film coil should be formed so as to be of very high density, that is, better space factor.

Japanese Patent Application Publication Laid Open Hei 11-345404 discloses a magnetic head and a manufacturing method. The publication discloses a process for forming a thin-film coil of high space factor. In the process, a first coil and a second coil are formed on substantially the same plane.

In the process disclosed in the publication, an underlying film used to form the second coil remains between the first and second coils so that a short circuit is likely to happen between the remaining underlying film, electrically connected with the second coil, and the first coil. In other words, since there is only a very thin insulating film between the underlying film and the first coil, the insulating film may become too thin or broken by polishing, or some polishing refuse may cause a short circuit between winding portions. Further, undesirable capacity may be generated between the first coil and the underlying film and it may raise a serious problem in coil characteristics.

SUMMARY OF THE INVENTION

The present invention seeks to solve such problems. In particular, the present invention provides a thin-film coil comprising a first coil and a second coil each having a desired number of winding, the first coil and the second coil being electrically connected in series, also provides a magnetic head using the thin-film coil. In the thin-film coil, the second coil is formed between winding portions of the first coil so as to be substantially on the same plane, and only an insulating film is interposed between the first and the second coils.

The present invention also provides a method of manufacturing a thin-film coil and a magnetic head comprising the steps of: forming a first coil having a predetermined number of winding via a first insulating film; forming a second insulating film on a surface of the first coil and between its winding portions; forming an underlying conductive film on the second insulating film, and treating the underlying conductive film so as to leave only its bottom portions between the winding portions of the first coil; and growing deposition originating from a remaining portion of the underlying conductive film on the bottom portions between the winding portions of the first coil so as to form a second coil.

In the present invention, as described above, since only the insulating film is interposed between the first coil and the second coil which are formed substantially on the same plane, a space between the first coil and the second coil may be reduced, thereby providing a thin-film coil of high space factor and of excellent characteristics.

The present invention provides the following advantages: complete insulation between winding portions of the first and second coils is achieved because only an insulating film is interposed between the first coil and the second coil; reliability and performance of coil are provided because undesired capacity is not caused between the winding portions; a space between thin-film coils may be small so as to allow miniaturization; a thin-film coil of high space factor may be manufactured with a reduced accuracy in patterning so as to simplify manufacturing processes and to improve its yield and productivity; the first coil and the second coil compensate for resistance because of thickness, that is, width of the coils so that a total resistance of the coils is substantially constant regardless of pattern accuracy; and coils of substantially the same turns are formed on one plane and a thickness in height direction is no more than half of conventional one so that a finished surface may be smooth or even.

With these advantages, when a thin-film coil in accordance with the present invention is applied to a magnetic head, a magnetic circuit length may be shortened and recording efficiencies may be improved; productivity of magnetic heads may be increased; a high yield and low cost may be achieved; because of the constant resistance, it may be easy to design a variety of circuits for driving a magnetic head; and a magnetic core is formed on an even surface so that generation of magnetic domain walls may be suppressed, strain may be relieved, and magnetic characteristics may be improved as well.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIGS. 1A and 1B are schematic views for explaining a thin-film coil according to an embodiment of the present invention, in which FIG. 1A is a plan view and FIG. 1B is a cross-sectional view;

FIGS. 2A and 2B are schematic views for explaining winding directions of each coil, in which FIG. 2A shows a first coil and a second coil separately and FIG. 2B shows a state of the second coil interposed between the first coil;

FIGS. 4A and 4B are schematic views (No. 1) for explaining a manufacturing process, in which FIG. 4A is a plan view and FIG. 4B is a cross-sectional view cut along line IV-IV of FIG. 4A;

FIGS. 5A and 5B are schematic views (No. 2) for explaining a manufacturing process, in which FIG. 5A is a plan view and FIG. 5B is a cross-sectional view cut along line V-V of FIG. 5A;

FIGS. 6A and 6B are schematic views (No. 3) for explaining a manufacturing process, in which FIG. 6A is a plan view and FIG. 6B is a cross-sectional view cut along line VI-VI of FIG. 6A;

FIGS. 7A and 7B are schematic views (No. 4) for explaining a manufacturing process, in which FIG. 7A is a plan view and FIG. 7B is a cross-sectional view cut along line VII-VII of FIG. 7A;

FIGS. 8A and 8B are schematic views (No. 5) for explaining a manufacturing process, in which FIG. 8A is a plan view and FIG. 8B is a cross-sectional view cut along line VIII-VIII of FIG. 8A;

FIGS. 9A and 9B are schematic views (No. 6) for explaining a manufacturing process, in which FIG. 9A is a plan view and FIG. 9B is a cross-sectional view cut along line IX-IX of FIG. 9A;

FIGS. 10A and 10B are schematic views (No. 7) for explaining a manufacturing process, in which FIG. 10A is a plan view and FIG. 10B is a cross-sectional view cut along line X-X of FIG. 10A;

FIGS. 11A and 11B are schematic views (No. 8) for explaining a manufacturing process, in which FIG. 11A is a plan view and FIG. 11B is a cross-sectional view cut along line XI-XI of FIG. 11A;

FIGS. 12A and 12B are schematic views (No. 9) for explaining a manufacturing process, in which FIG. 12A is a plan view and FIG. 12B is a cross-sectional view cut along line XII-XII of FIG. 12A;

FIGS. 13A and 13B are schematic representation (No. 10) for explaining a manufacturing process, in which FIG. 13A is a plan view and FIG. 13B is a cross-sectional view cut along line XIII-XIII of FIG. 13A;

FIGS. 14A and 14B are schematic representation (No. 11) for explaining a manufacturing process, in which FIG. 14A is a plan view and FIG. 14B is a cross-sectional view cut along line XIV-XIV of FIG. 14A;

FIGS. 15A and 15B are schematic representation (No. 12) for explaining a manufacturing process, in which FIG. 15A is a plan view and FIG. 15B is a cross-sectional view cut along line XV-XV of FIG. 15A;

FIG. 16 is a schematic view (No. 13) for explaining a manufacturing process;

FIGS. 22A and 22B are schematic views (No. 17) for explaining a manufacturing process, in which FIG. 22A is a plan view and FIG. 22B is a cross-sectional view cut along line XXII-XXII of FIG. 22A;

FIGS. 23A and 23B are schematic views (No. 18) for explaining a manufacturing process, in which FIG. 23A is a plan view and FIG. 23B is a cross-sectional view cut along line XXIII-XXIII of FIG. 23A;

FIGS. 24A and 24B are schematic views (No. 19) for explaining a manufacturing process, in which FIG. 24A is a plan view and FIG. 24B is a cross-sectional view cut along line XXIV-XXIV of FIG. 24A;

FIGS. 25A and 25B are schematic views (No. 20) for explaining a manufacturing process, in which FIG. 25A is a plan view and FIG. 25B is a cross-sectional view cut along line XXV-XXV of FIG. 25A;

FIGS. 26A and 26B are schematic views (No. 21) for explaining a manufacturing process, in which FIG. 26A is a plan view and FIG. 26B is a cross-sectional view cut along line XXVI-XXVI of FIG. 26A;

FIGS. 27A and 27B are schematic views (No. 22) for explaining a manufacturing process, in which FIG. 27A is a plan view and FIG. 27B is a cross-sectional view cut along line XXVII-XXVII of FIG. 27A;

FIGS. 28A and 28B are schematic views (No. 23) for explaining a manufacturing process, in which FIG. 28A is a plan view and FIG. 28B is a cross-sectional view cut along line XXVIII-XXVIII of FIG. 28A;

FIGS. 29A and 29B are schematic views (No. 24) for explaining a manufacturing process, in which FIG. 29A is a plan view and FIG. 29B is a cross-sectional view cut along line XXIX-XXIX of FIG. 29A;

FIGS. 30A and 30B are schematic views (No. 25) for explaining a manufacturing process, in which FIG. 30A is a plan view and FIG. 30B is a cross-sectional view cut along line XXX-XXX of FIG. 30A;

FIGS. 31A and 31B are schematic views (No. 26) for explaining a manufacturing process, in which FIG. 31A is a plan view and FIG. 31B is a cross-sectional view cut along line XXXI-XXXI of FIG. 31A;

FIGS. 32A and 32B are schematic views (No. 27) for explaining a manufacturing process, in which FIG. 32A is a plan view and FIG. 32B is a cross-sectional view cut along line XXXII-XXXII of FIG. 32A;

FIG. 33 is a schematic view (No. 28) for explaining a manufacturing process;

FIGS. 43A and 43B are schematic views for explaining a case where two coils are stacked, in which FIG. 43A shows a state before stacking and FIG. 43B shows a state after the coils are stacked;

DESCRIPTION OF THE PREFERRED EMBODIMENTS

Figure 1A:
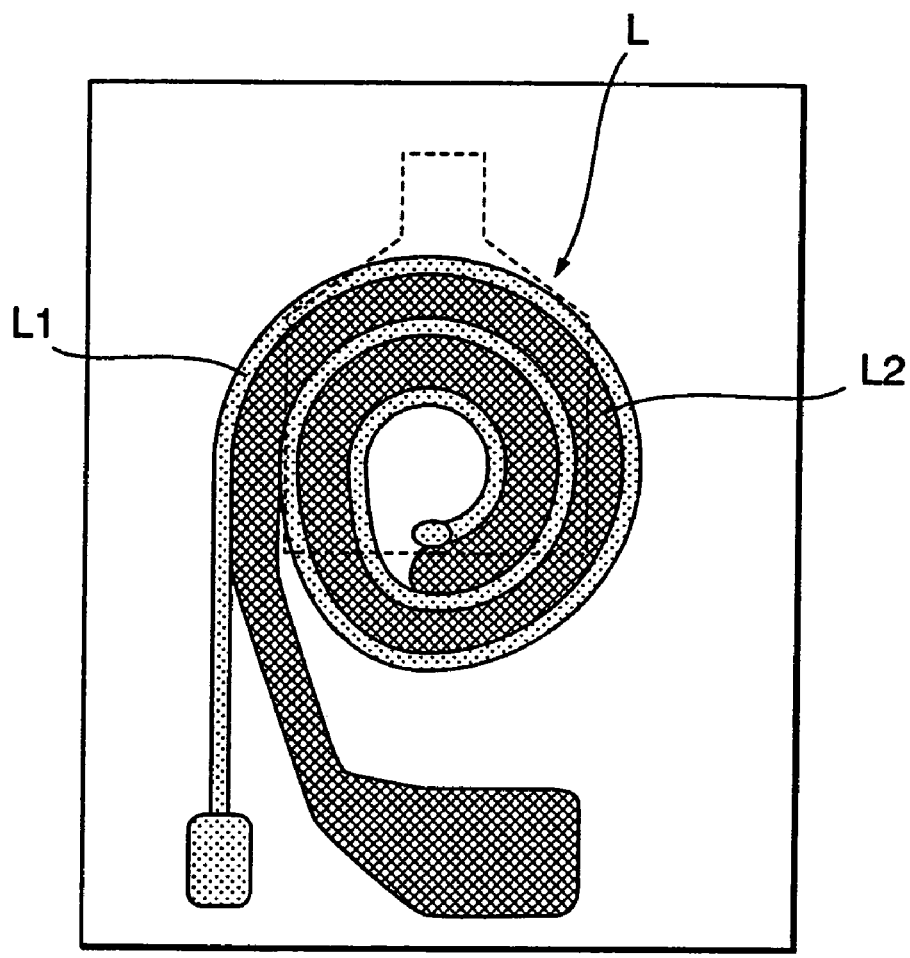
Figure 1B:
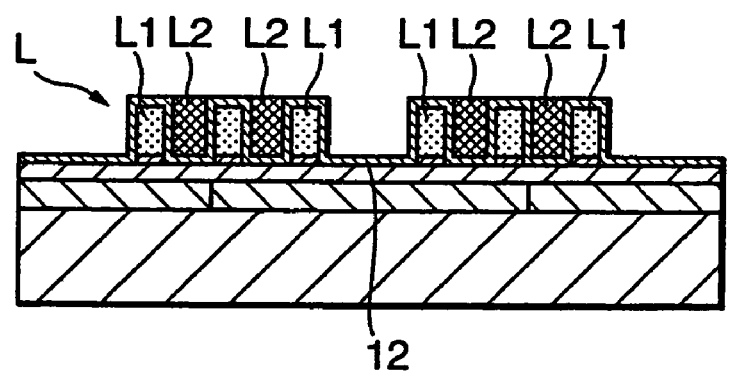

Hereinafter, the present invention will be described referring to the drawings. FIGS. 1A and 1B are schematic views of a thin-film coil according to an embodiment of the present invention, FIG. 1A is a plan view, and FIG. 1B is a cross-sectional view. In the embodiment, a thin-film coil L is provided in such a way that a first coil L1 having a desired number of winding and a second coil L2 having a desired number of winding are electrically connected in series and mounted in the thin-film coil L. In the thin-film coil L, the second coil L2 is formed between winding portions of the first coil L1 to be substantially on the same plane, and only an insulating film 12 is interposed between the second coil L2 and the first coil L1.

The first coil L1 and the second coil L2 are electrically connected at their terminals so as to constitute the thin-film coil L. FIGS. 2A and 2B are schematic views to explain winding directions of each coil. The first coil L1 is, for example, is wound from outside to inside along current directions (as shown by arrows in FIG. 2A). The second coil L2 is also wound from outside to inside along current directions. Thus, the second coil L2 is formed between winding portions of the first coil L1 and an inner terminal of the first coil L1 and an outer terminal of the second coil L2 are electrically and mechanically connected as shown in FIG. 2B.

As shown in FIG. 1B, the first coil L1 and the second coil L2 each have substantially rectangular cross sections, however, the cross sections may be trapezoids where a longer side (base edge) of one trapezoid is adjacent to a shorter side (top edge) of the other trapezoid. For example, if the cross section of the first coil L1 as in FIG. 1B is a trapezoid in which the base edge is longer, the insulating film 12 covering the first coil L1 is provided with a good throwing power, whereby the insulating film 12 may be thinner.

Figure 3:
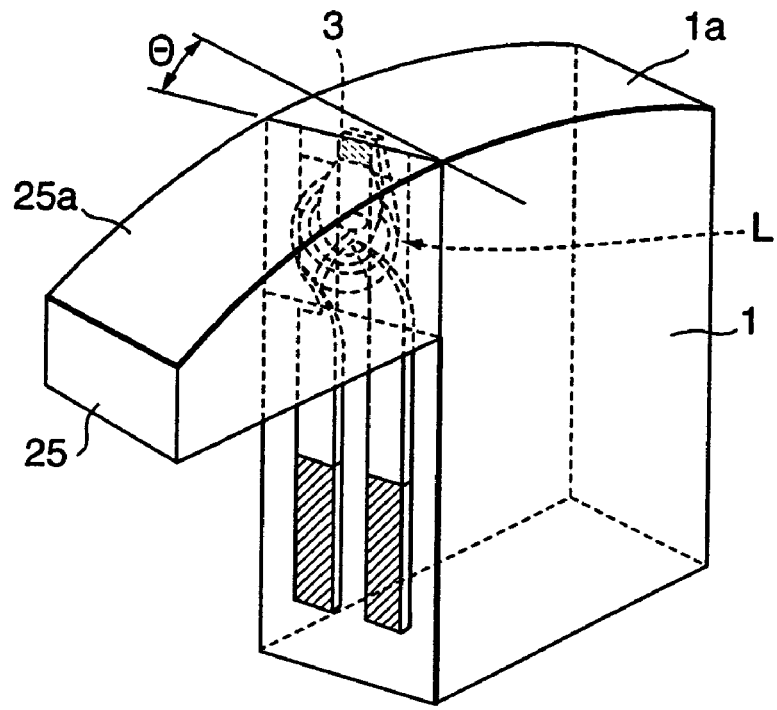
FIG. 3 is a schematic perspective view showing an example of a thin-film magnetic head.

Such a thin-film coil L is applicable to a thin-film inductor, a thin-film magnetic head as shown in FIG. 3, and the like. To obtain such a thin-film magnetic head, a film 3 of magneto-resistive effect element and a thin-film coil L are formed on a hard non-magnetic substrate 1 which is, with a bonding substrate 25 on it, polished at sliding surfaces 1a and 25a so as to be in a substantial arc-shape and is cut so as to have an azimuth angle θ.

This embodiment is characterized in a thin-film coil employed in a thin-film magnetic head, for example, and in a method of manufacturing the thin-film coil. The method of manufacturing the thin-film coil and a method of manufacturing the magnetic head will be described hereinafter in order.

Figure 4A:
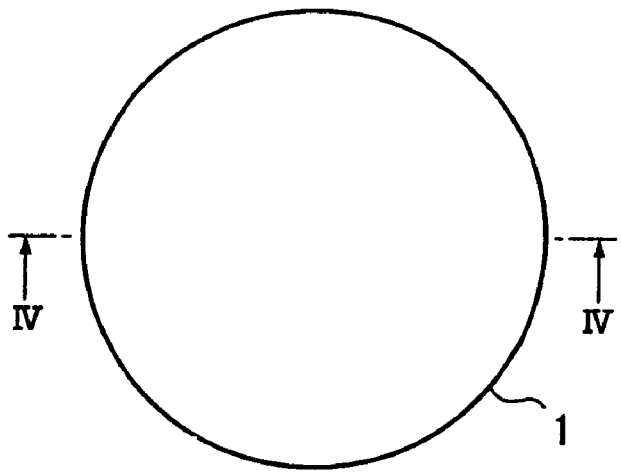
Figure 4B:

First, a substrate 1 is prepared as shown in FIGS. 4A and 4B. Materials for the substrate 1 are not limited to this embodiment and any materials may be selected according to its use. In this embodiment, $Al_2O_3$—TiC (AlTiC), $\alpha$-$Fe_2O_3$ (hematite) which is one of iron oxides and the like are suitable. A substrate of 4 inches in diameter and 2 mm in thickness is prepared.

Figure 5A:
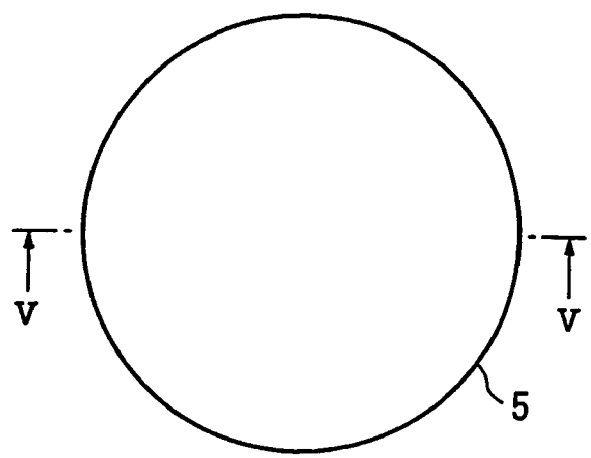
Figure 5B:
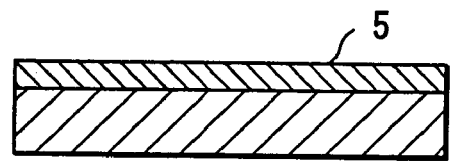

Secondly, as shown in FIGS. 5A and 5B, a lower-layer core material 5 is formed to be a lower-layer core of a magnetic recording head. Any material may be selected for the lower-layer core material 5 as long as it is allowable in terms of magnetic characteristics. To increase recording efficiencies, it is preferable to use a soft magnetic film of higher magnetic permeability and of higher saturation magnetic-flux density as long as possible. In this embodiment, FeAlSi (sendust) film of 2.5 μm is formed by means of sputtering. Any method of forming the lower-layer core material 5 may be selected. The thickness of the lower-layer core material 5 is preferably more than or equal to 2 μm.

Figure 6A:
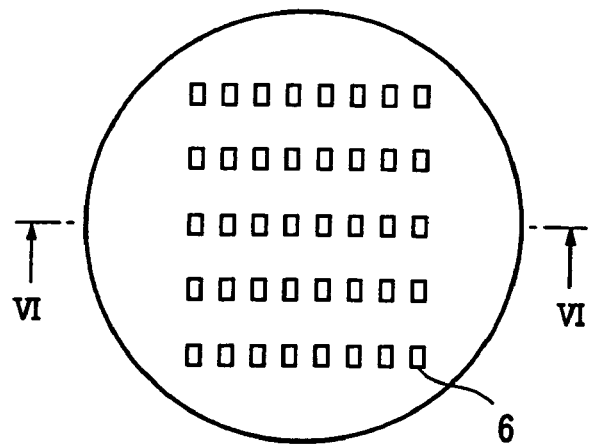
Figure 6B:
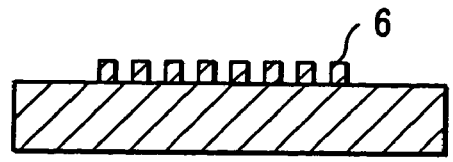

As shown in FIGS. 6A and 6B, the lower-layer core material is patterned and etched then cut into portions for respective magnetic heads to form lower-layer cores 6. In this embodiment, the lower-layer cores 6 are formed in such a manner that patterning of a resist film is carried out by means of a photolithographic process and undesirable portions are removed by means of an ion etching process, however, other processes may be applicable.

Figure 7A:
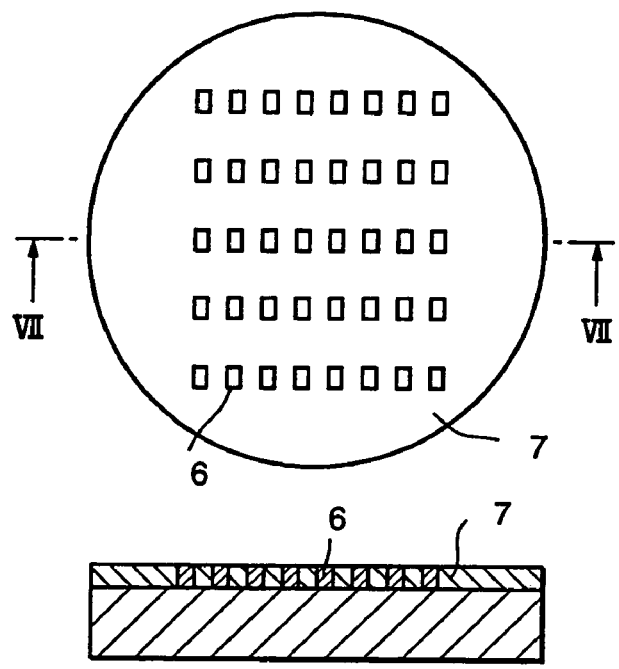
Figure 7B:
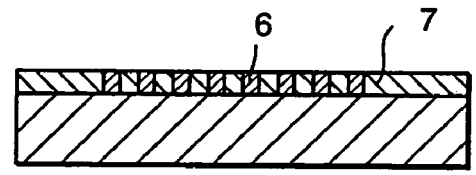

As shown in FIGS. 7A and 7B, the rugged lower-layer cores 6 are embedded within a non-magnetic material. In this embodiment, an $Al_2O_3$ film 7 having the same thickness as the lower-layer cores 6 is coated by sputtering, then an uneven surface is planarized by means of CMP (chemical mechanical polishing) or buffing. The method and materials for planarization are not limited to this embodiment and any method or material may be selected.

Figure 8A:
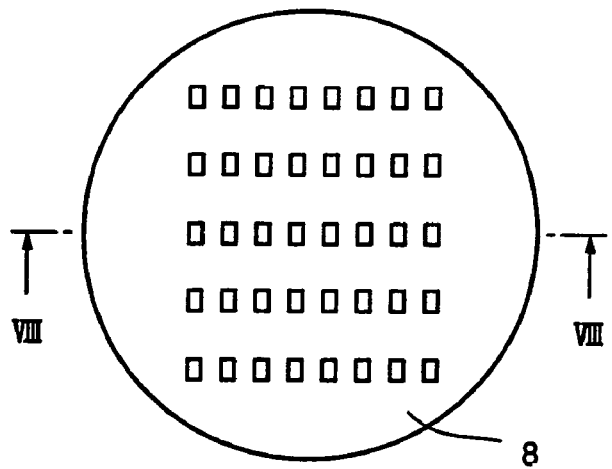
Figure 8B:
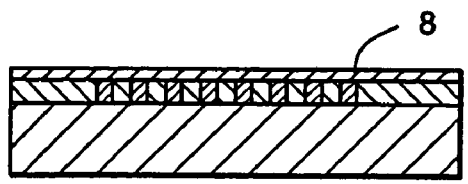

As shown in FIGS. 8A and 8B, a gap film 8 is provided to form a front gap of a recording head where a $SiO_2$ film of 0.2 μm thick is formed by sputtering. Materials for the gap film 8 need only be non-magnetic and non-conductive, and $Al_2O_3$ may be used other than $SiO_2$. A thickness of the gap film 8 is determined in accordance with overwriting characteristics and a magneto-motive force which are required by systems.

A process of forming a thin-film coil, a major process of this embodiment, will be described hereafter. As shown in FIG. 9, a film comprising Ti/Cu layers to be an underlying conductive film 9 for plating is formed by sputtering on a surface of the gap film 8. The underlying conductive film 9 functions as a conductive portion to distribute plating current to the whole surface of the substrate (wafer) during plating.

As to the Ti/Cu layer, the underlying conductive film 9 for plating, the Ti layer is set to a thickness of 30 nm and the Cu layer is set to a thickness of 100 nm. The Ti layer is coated to increase adhesion between the gap film 8 and the Cu layer, any thickness may be selected for the Ti layer. The material Cu is selected considering the subsequent Cu-plating process to form a thin-film coil so as to be the same material. Some portions of the underlying conductive film 9 for plating become a part of the thin-film coil to be formed later. Since other portions of the underlying conductive film 9 are to be removed, a thickness of the underlying conductive film 9 for plating is not so large and is preferably less than or equal to 0.3 µm, for example.

Figure 9A:
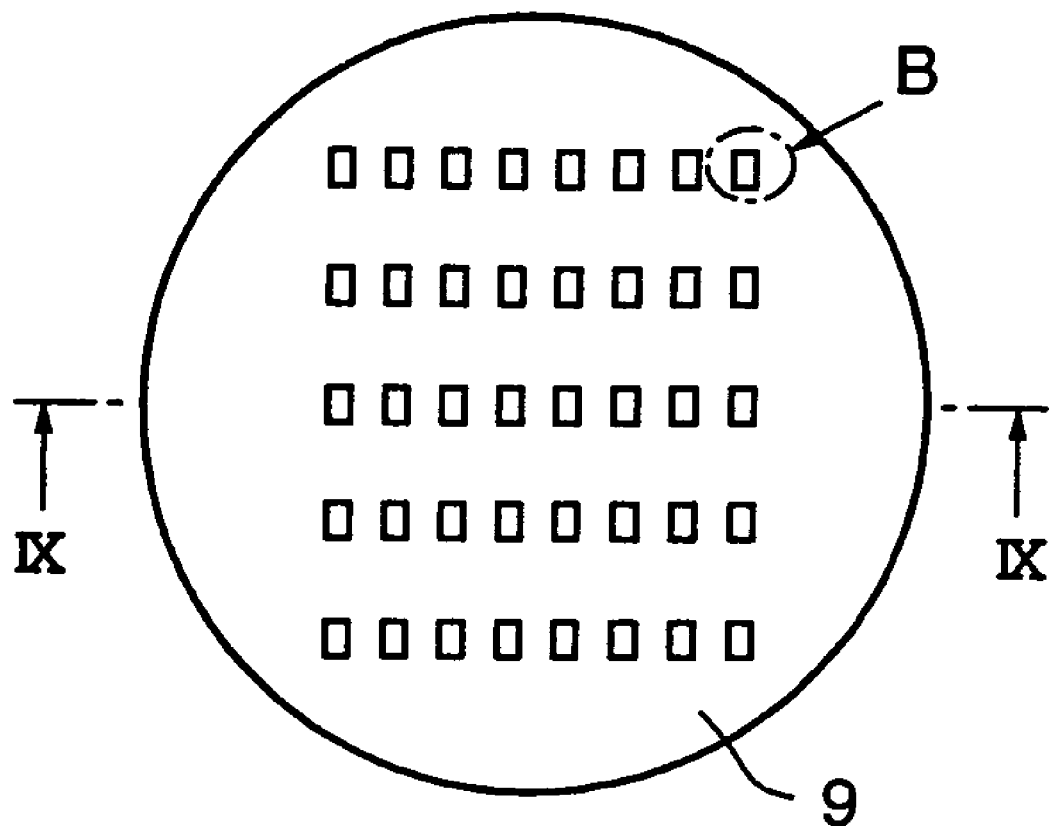
Figure 9B:
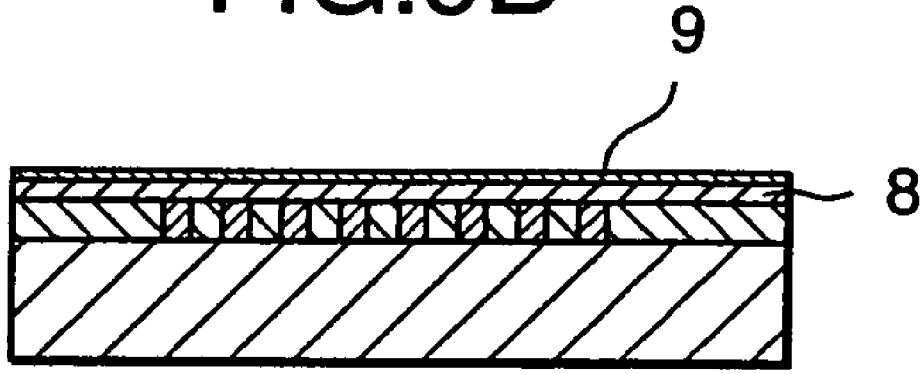
Figure 10A:
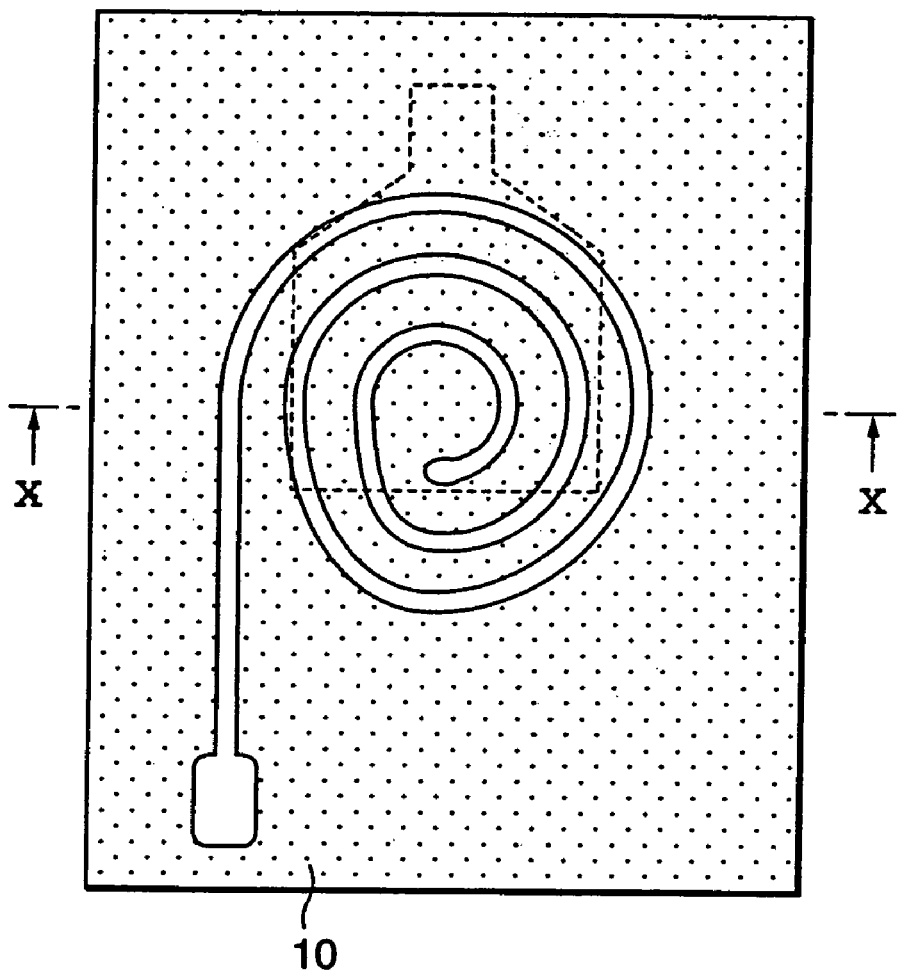
Figure 10B:
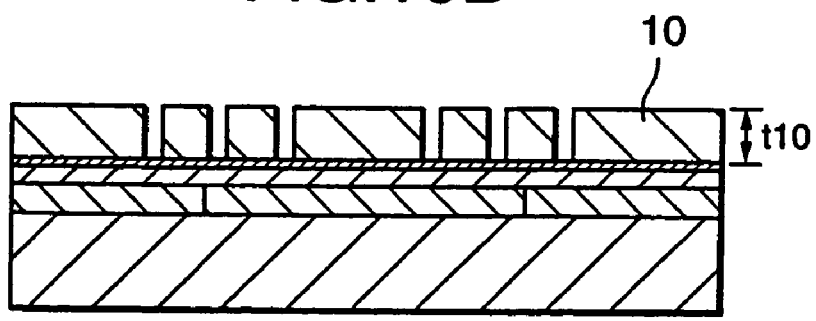

Hereinafter, processes will be described focusing on a circle B (an element) as shown in FIG. 9A. A pattern 10 having an opening corresponding to a shape of the first coil, as shown in FIG. 10A, is formed by means of a photolithographic process. A resist film used in this process has a thickness of about 8 µm. The film is coated at 2000 rpm, for example. Any material for the resist film may be selected as far as its profile is sufficient. Since the first coil is set to a thickness of about 6 µm, a thickness t10 of the pattern 10 of the resist film needs to be at least greater than that of the first coil.

Figure 11A:
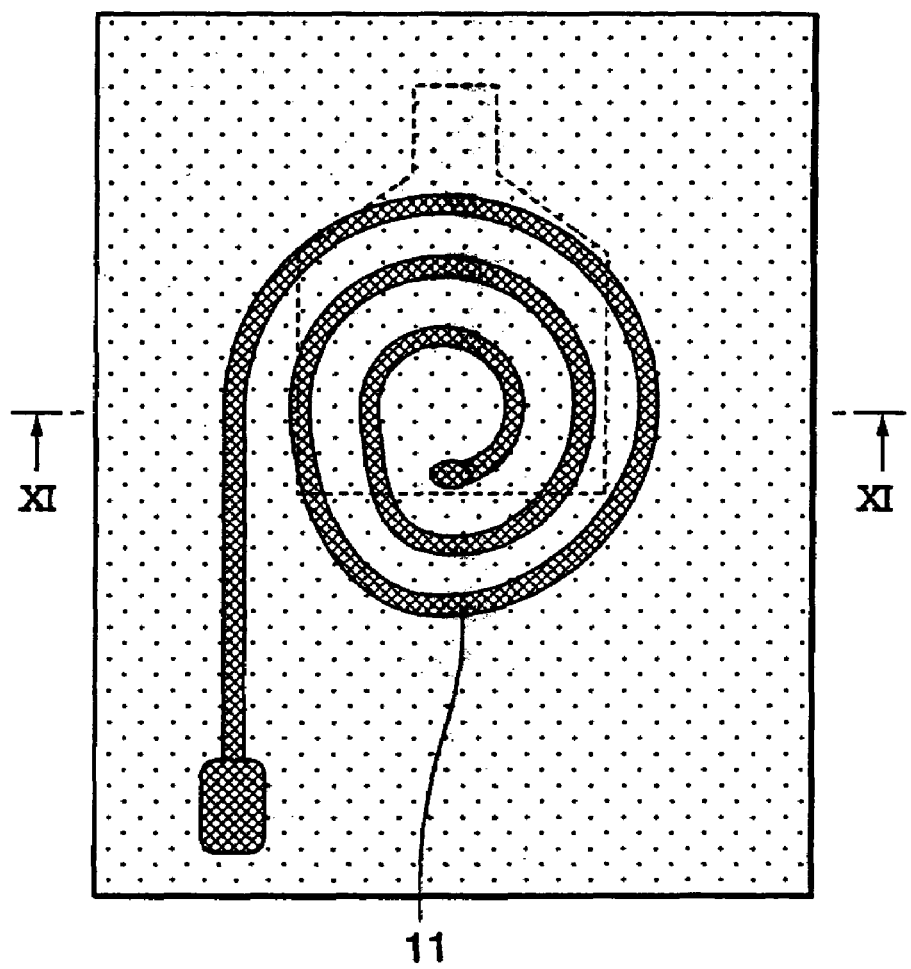
Figure 11B:
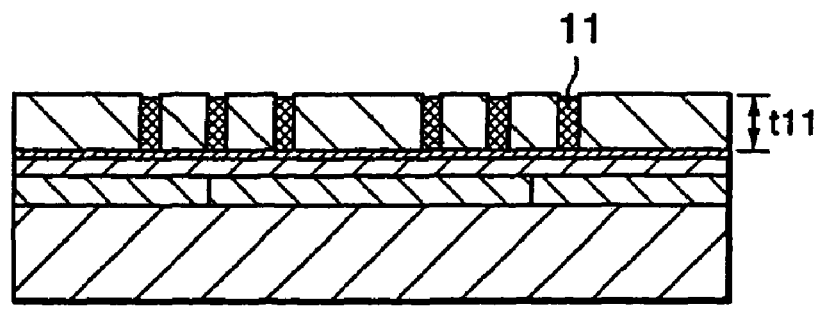

As shown in FIGS. 11A and 11B, copper (Cu) is deposit d to form a first coil deposition 11 at opening potions of the resist pattern 10. The deposition may be carried out by means of electroplating using a copper sulfate solution or a copper pyrophosphate solution. Plating solutions are not limited to such a copper sulfate solution or a copper pyrophosphate solution, and any solution may be used. Metals dissolved in such a plating solution is not limited to copper and other metals such as gold may be used, in which case it is preferable to match materials for the underlying conductive film 9 with the materials to be deposited. In this embodiment, the thickness t11 of the deposition is selected to be 6 µm.

Figure 12A:
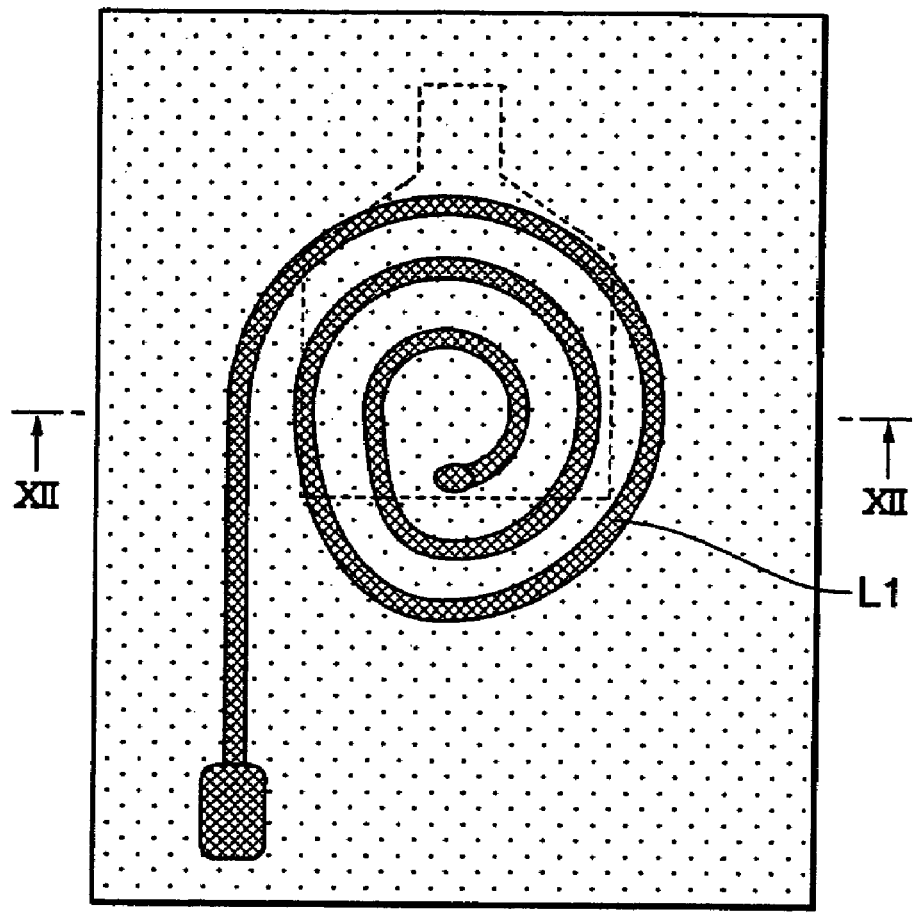
Figure 12B:
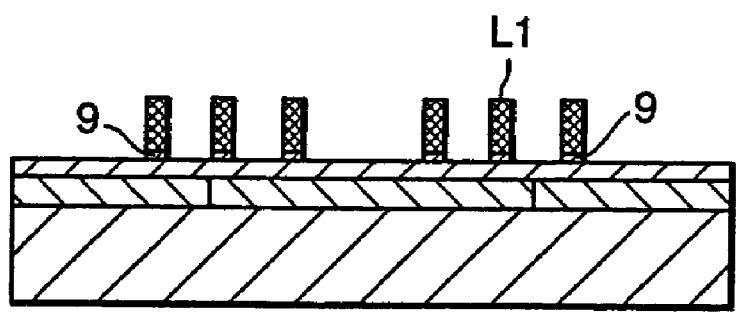

As shown in FIGS. 12A and 12B, the patterned resist film is dissolved in an organic solvent and removed, then the underlying conductive film 9 for plating, except for that at the coil, is removed by treating the whole surface of the substrate by means of ion etching, in which an incident angle to the substrate is preferably set to be as perpendicular as possible so as to remove the underlying conductive film between winding portions of the coil completely. In this embodiment, the incident angle is set to 0 degree (perpendicular incidence). The angle of incidence may be optimized such that an etching apparatus can remove the whole underlying conductive film 9 between coils or winding portions completely. These steps provide a first coil L1.

Figure 13A:
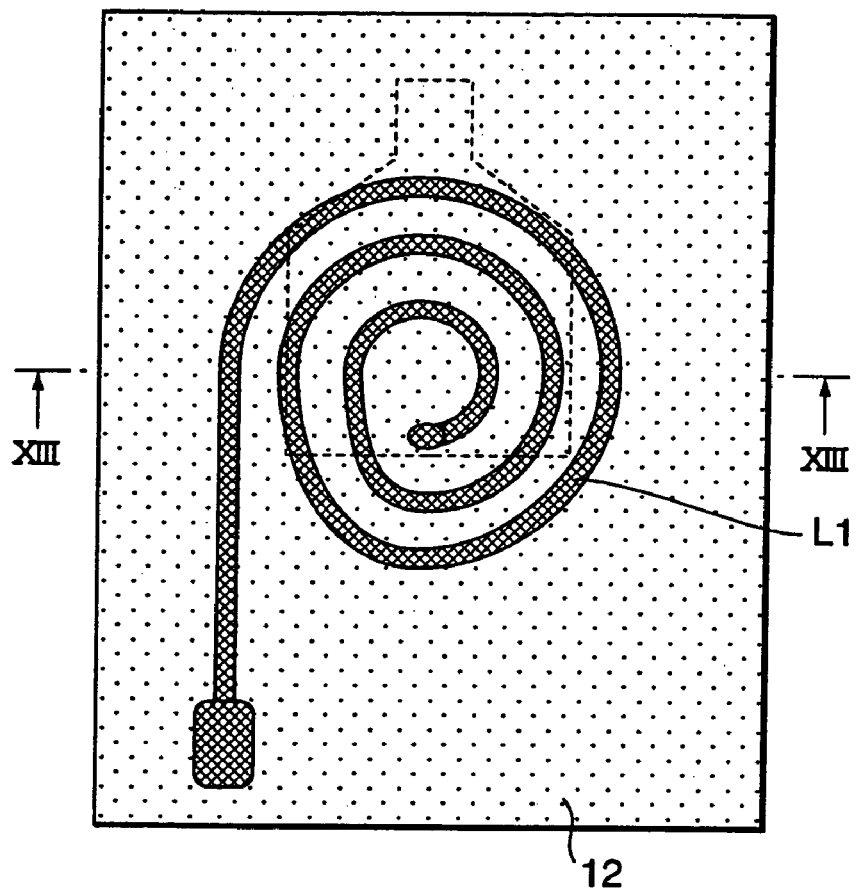
Figure 13B:
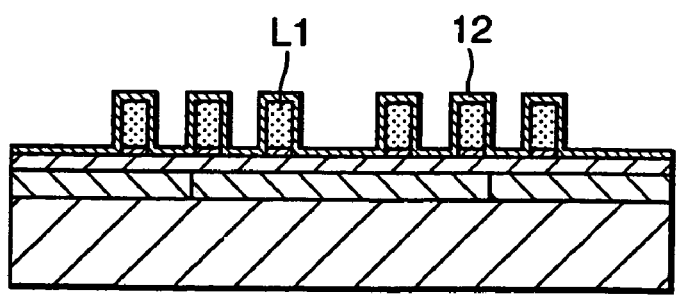

As shown in FIGS. 13A and 13B, an insulating film 12 is formed between the first coil L1 and the second coil (not shown) to insulate the first coil L1 from the second coil. The second coil is formed, as will be described, threading between and along winding portions of the first coil L1 so that a space between the first coil L1 and the second coil is very narrow. An electrically non-conductive film (the insulating film 12) is provided to electrically insulate one coil from the other coil. In this embodiment, an $Al_2O_3$ film with a thickness of 0.5 µm is formed by a sputtering process.

In the embodiment, any material for the insulating film 12 may be selected as far as it is electrically non-conductive and non-magnetic. The thickness of the insulating film 12 is selected to be 0.5 µm so as to obtain sufficient insulation with minimum quantity of the material and to coat sidewalls of the first coil L1 and bottom portions between winding portions completely, thus the sputtering process is preferably chosen. Any other method, such as vapor deposition, may be employed. Covering effect or status of the first coil L1 may vary depending on forming processes and apparatuses. Thus, any forming process and apparatus may be selected as long as the first coil is completely covered.

Figure 14A:
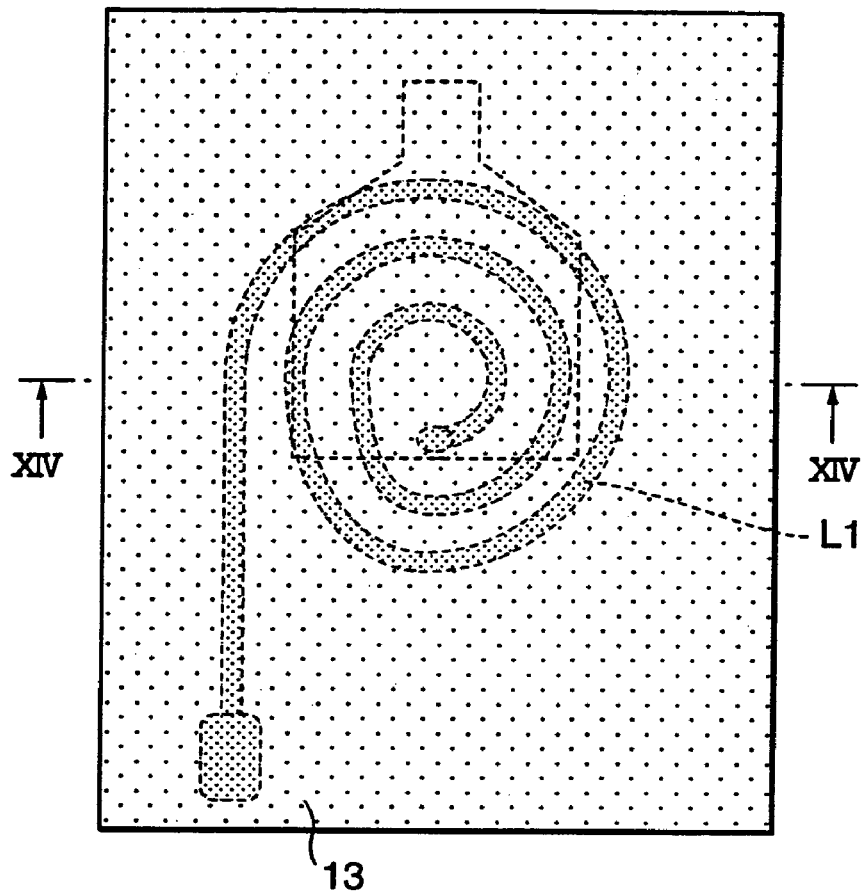
Figure 14B:
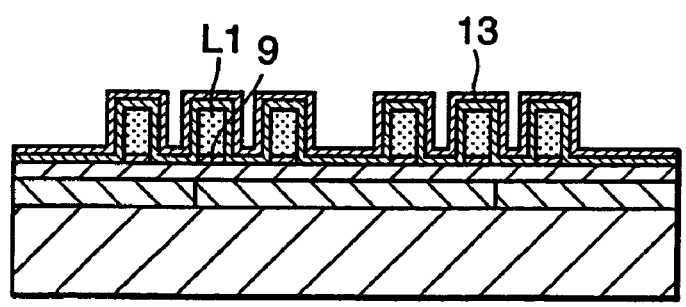

As shown in FIGS. 14A and 14B, an underlying conductive film 13 (such as a film of Ti/Cu) for plating to be used for the second coil is formed by a sputtering process. The underlying conductive film 13 underlies during depositing the second coil. Similar to the underlying conductive film 9 for the first coil L1, since it is important to form the underlying conductive film 13 on the bottom portions between winding portions of the first coil L1 as well, a thickness of the underlying conductive film 13 is preferably somewhat greater than that of the underlying conductive film 9 of the first coil L1. As to the film of Ti/Cu layers, in this embodiment, the Ti layer is set to a thickness of 30 nm and the Cu layer is set to a thickness of 200 nm.

A step for removing the underlying conductive film 13 for plating, the step being a major feature of this embodiment, will be described in detail. In this embodiment, a plating step for the second coil does not immediately follow the plating, but follows the step for removing the underlying conductive film 13 partially. Reasons why will be described later. It is noted that the method and the material used for forming the second coil are the same as those used for forming the first coil.

Figure 15A:
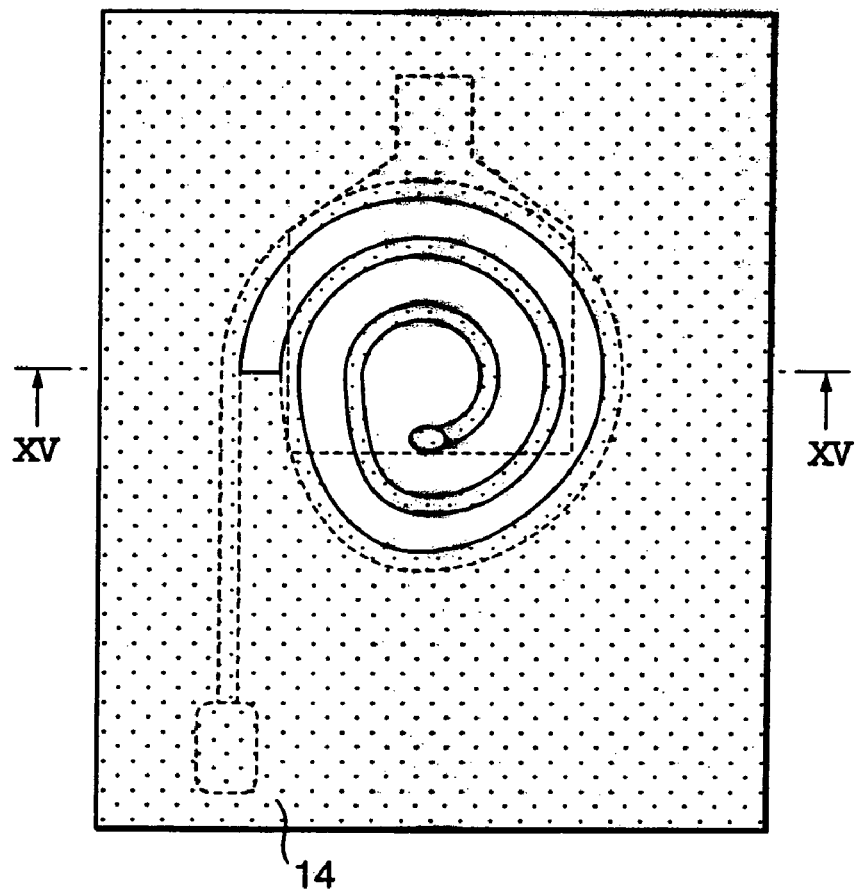
Figure 15B:
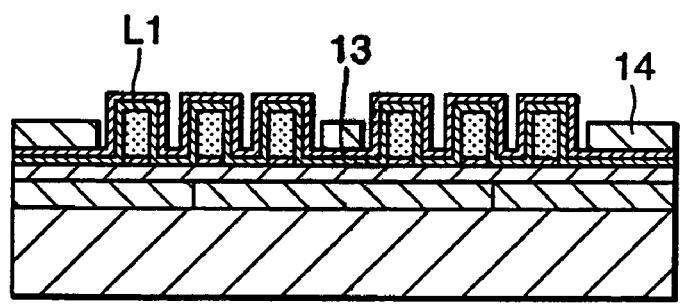

As shown in FIGS. 15A and 15B, a protective resist film 14 is patterned by a photolithographic process so as to cover desired parts of the underlying conductive film 13 such that the desired parts are not removed. The desired parts to be left are peripheral portions of the second coil and an entrance portion of the second coil to supply the second coil with plating current.

An area to be the second coil that is formed by growing plating is between the winding portions of the first coil L1. The underlying conductive film 13 for plating at the area needs to be left during the plating process. As shown in FIG. 15A, the pattern of the resist film 14 has an opening between the winding portions of the first coil L1 except the entrance portion.

As will be described later, although the openings are provided, an etching process is carried out with a certain angle, the underlying conductive film 13 at the bottom portions between the winding portions of the first coil L1 is not removed. The underlying conductive film 13 at the bottoms functions as an underlying conductive film during plating of the second coil.

As shown in FIG. 16, an ion etching process is applied to the whole surface of the substrate where the ion etching process is carried out with an angle. The reason is that the underlying conductive film 13 for plating the second coil covers the first coil L1, and the underlying conductive film 13 on tops and sidewalls of the first coil L1 is removed so as to leave only the underlying conductive film 13 at the bottom portions between the winding portions of the first coil L1 (see FIG. 17).

Figure 18:
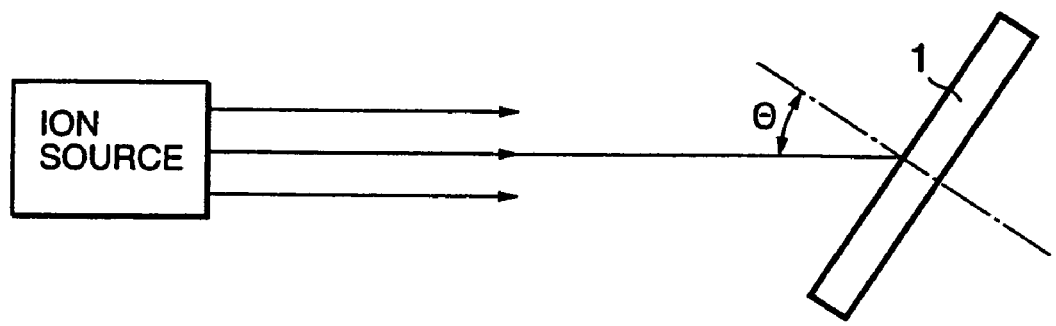
FIG. 18 is a schematic view (No. 15) for explaining a manufacturing process.

The reason of the arrangement will be described later. As shown in FIG. 18, the substrate 1 is tilted during the ion etching process so as to obtain such a shape. As shown in FIG.

19, the tilted angle is theoretically expressed by the followings:

$$\theta = \tan^{-1}\{(\text{space between winding portions of first coil} \\ \text{L1} - \text{thickness of insulating film } 12 \times 2 - \text{thickness} \\ \text{of underlying conductive film } 13 \times 2)/(\text{thickness} \\ \text{of first coil L1})\}$$

Figure 19:
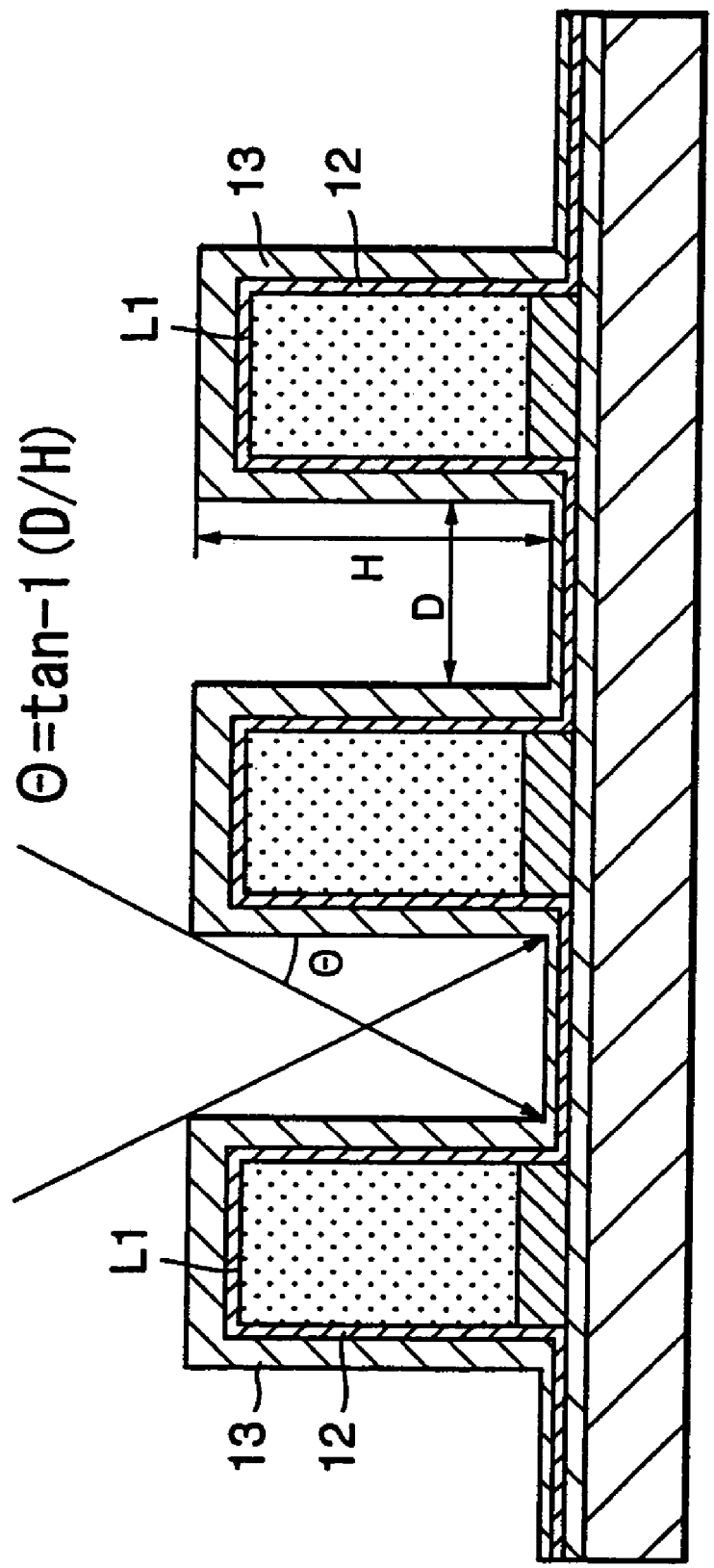
FIG. 19 is a schematic view (No. 16) for explaining a manufacturing process.

An expression in FIG. 19 says that the angle is determined by $\theta = \tan^{-1}(D/H)$.

Figure 17:
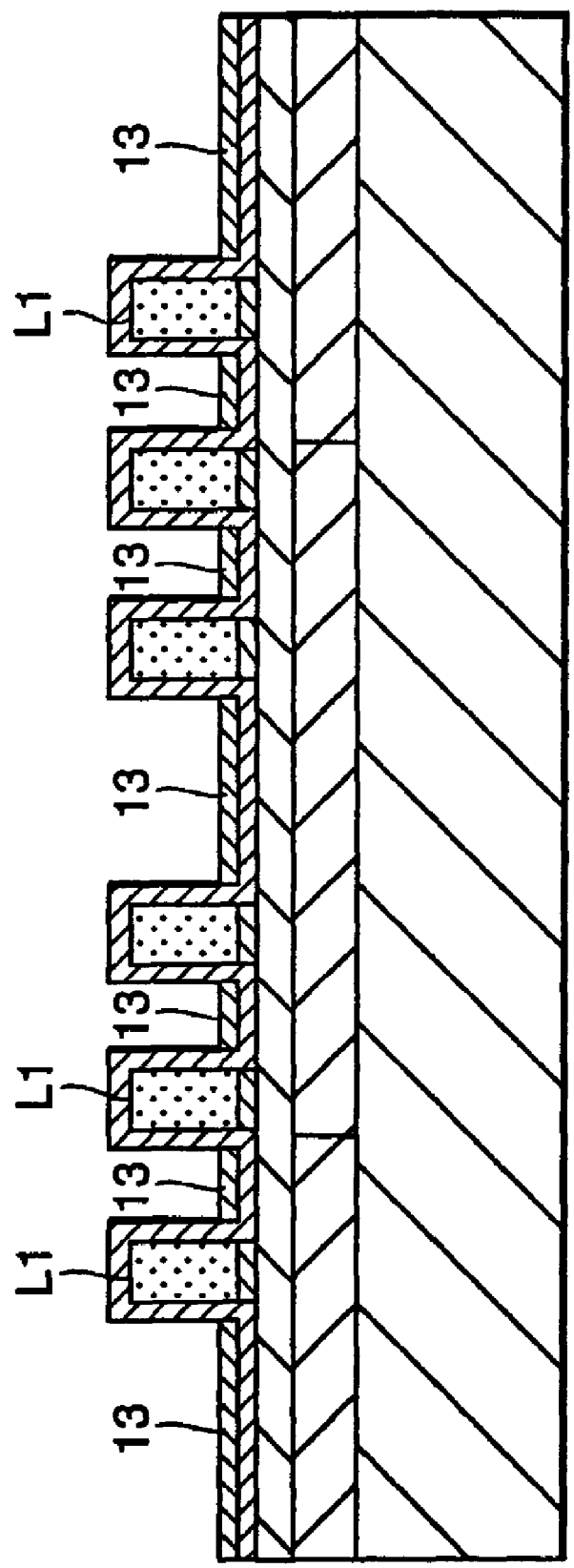
FIG. 17 is a schematic view (No. 14) for explaining a manufacturing process.

In a conventional ion etching apparatus, however, incident angles of any particles do not have a single value, and it is necessary to find an optimal angle for each apparatus to be used. An ideal resulting shape is shown in FIG. 17 where the underlying conductive film 13 on the tops and sidewalls of the first coil is completely removed.

Figure 20:
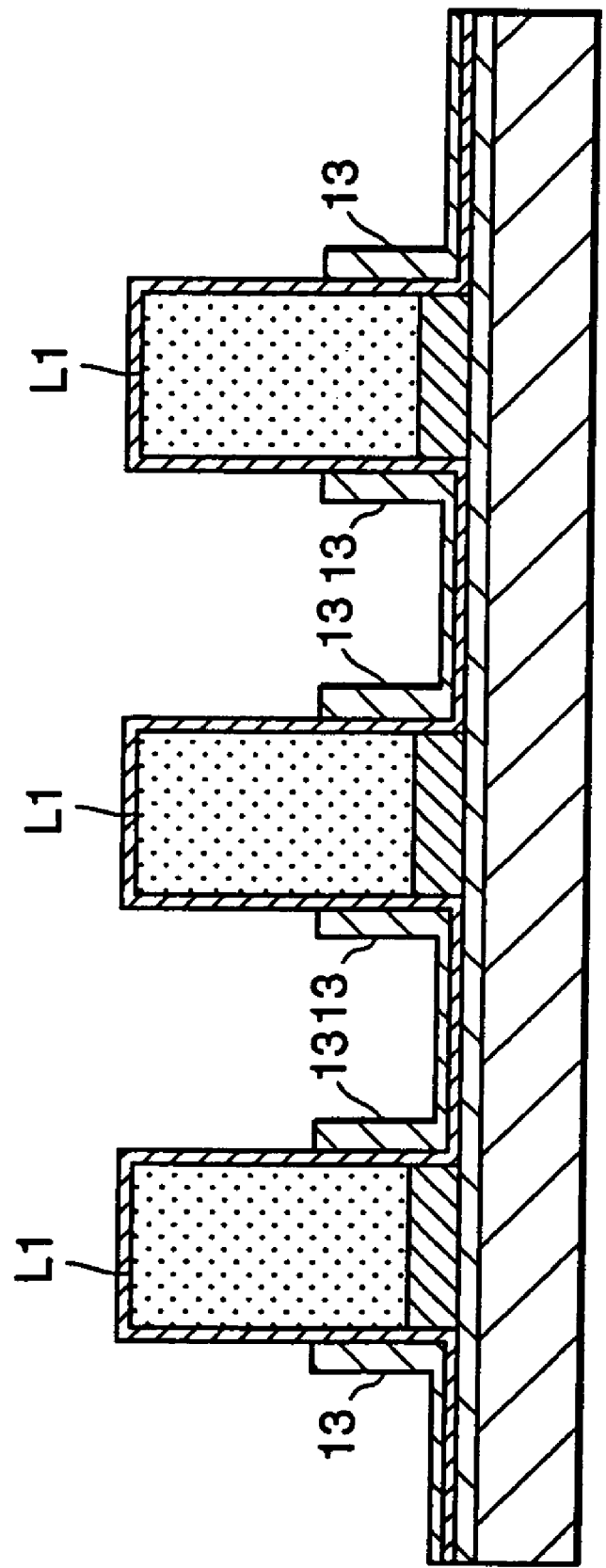
FIG. 20 is a schematic view showing a state of an underlying conductive film for plating.
Figure 21:
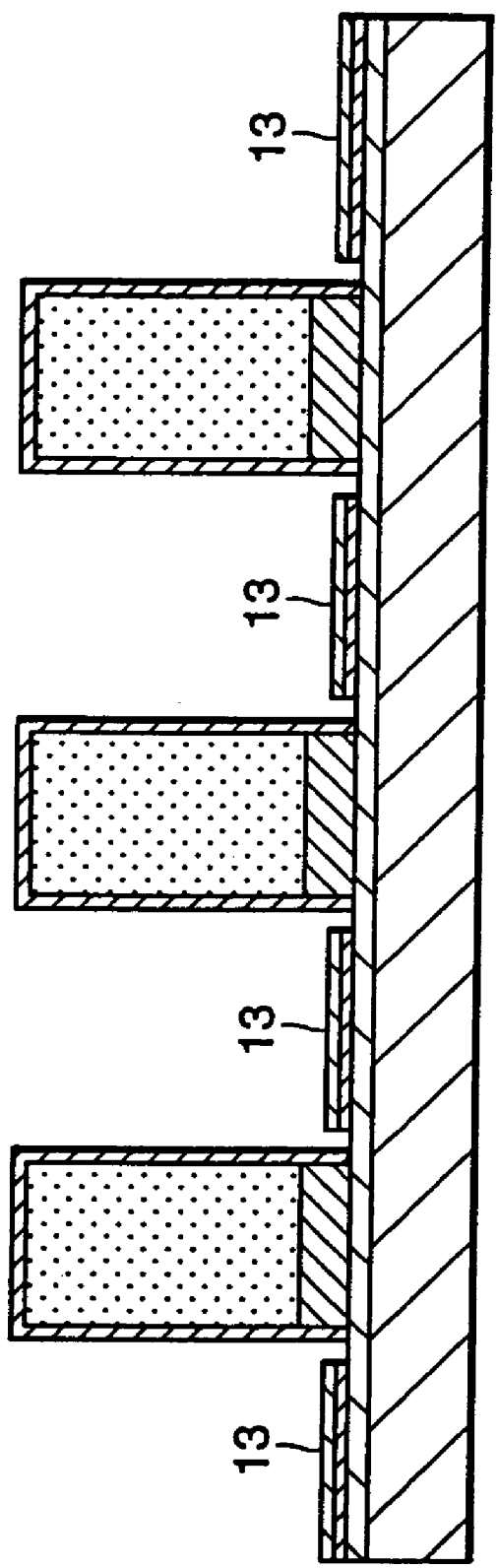
FIG. 21 is a schematic view showing a state of a remaining portion of the underlying conductive film for plating after removal.

As to the sidewalls, the underlying conductive film 13 is not left on the sidewalls of the first coil L1 as shown in FIG. 20. Several parts of the underlying conductive film 13 are to be removed as shown in FIG. 17 or FIG. 21. Whichever, it is important to remove the underlying conductive film 13 located on the tops and the sidewalls of the first coil L1.

Figure 22A:
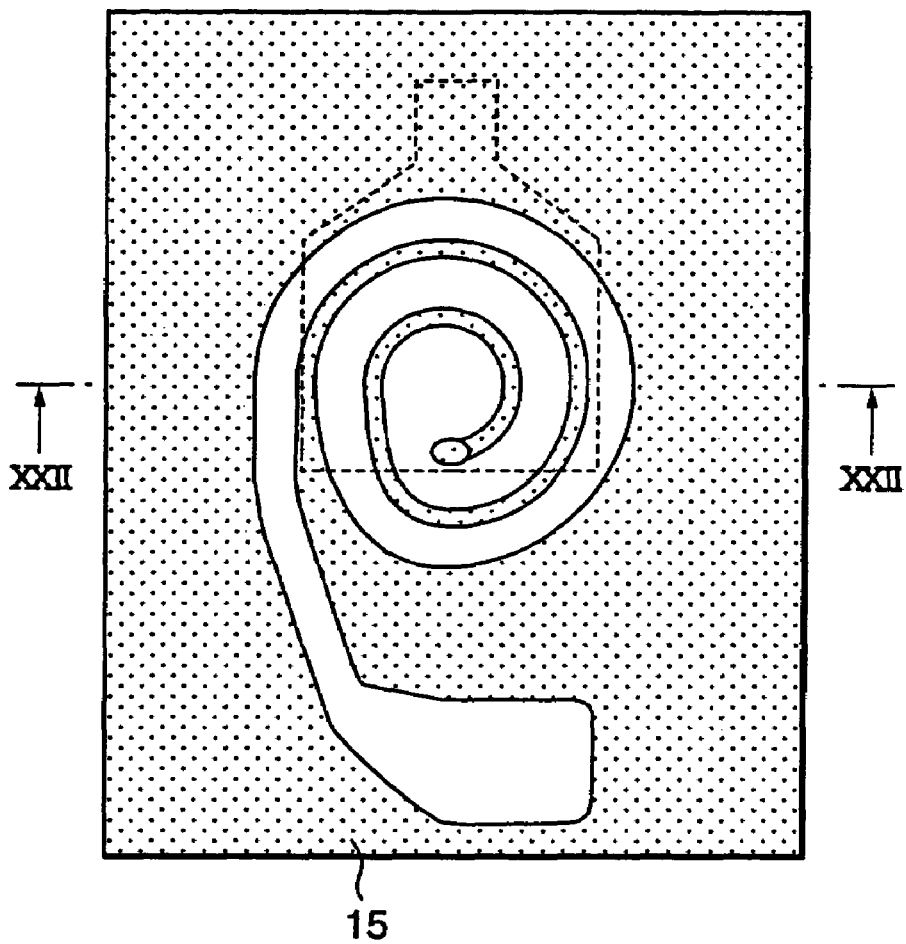
Figure 22B:
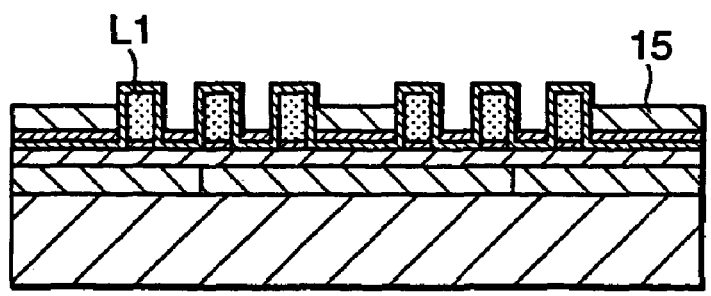

After completion of etching, the protective resist film 14 is dissolved and removed by an organic solution, then, as shown in FIGS. 22A and 22B, a resist film 15 having an opening for the second coil is patterned by means of a photolithographic process.

At this point, it should be noted that the resist film 15 does not have the shape of a coil pattern as formed for the first coil L1 but has an opening which correspond to the whole of the first coil L1. As to the winding portions, the resist film 15 only covers circumferences of the first coil L1.

In other words, a fine pattern corresponding to the shape of the coil pattern is not necessary. The reason is that since the underlying conductive film 13, used for the second coil L2, covering the first coil L1 has been removed, plating does not grow out of portions where the underlying conductive film 13 is not located but grow only out of the bottom portions between the first coil L1, whereby any fine patterns are not required.

Figure 44:
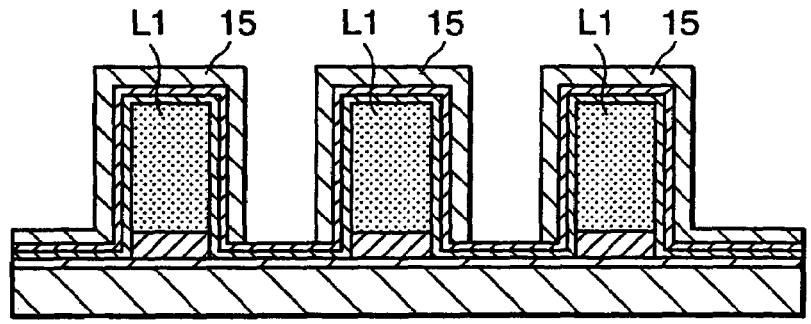
FIG. 44 is a schematic view for explaining patterning of a resist film in a conventional process (No. 1)

On the other hand, in a conventional process where a fine patterning of resist film is applied to the second coil L2 to grow deposition, as shown in FIG. 44, the resist film 15 needs to be formed so as to cover the first coil L1 completely.

Since the first coil L1 is built up as high as 6 μm, it is very difficult to cover the whole of the first coil L1 completely with a thin film. This is because there may be problems with pattern mismatching as shown in FIG. 45A, sharpened pattern as shown in FIG. 45B, or remaining resist as shown in FIG. 45C.

In other words, because of incorrect exposure or incorrect developing in a photolithographic process, or undesirable rugged surface of the first coil L1 formed by plating, the resist film 15 to cover becomes uneven, whereby several parts of the tops and the sidewalls of the first coil L1 may often be exposed. In particular, the resist film on edges of the tops of the first coil L1 tends to be thin, which results in that the edges are mostly exposed in fact.

Figure 45A:
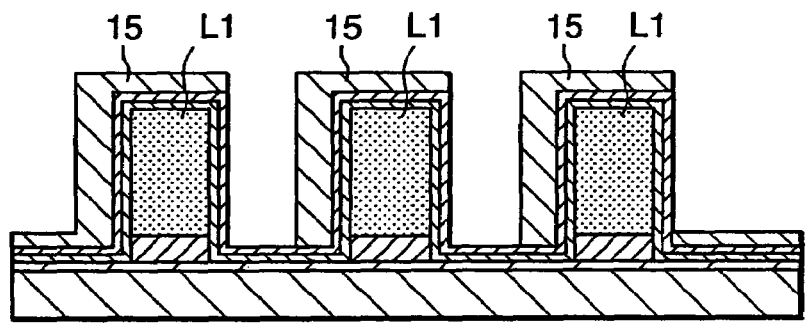
FIGS. 45A, 45B and 45C are schematic views for explaining patterning of a resist film in a conventional process (No. 2)
Figure 45B:
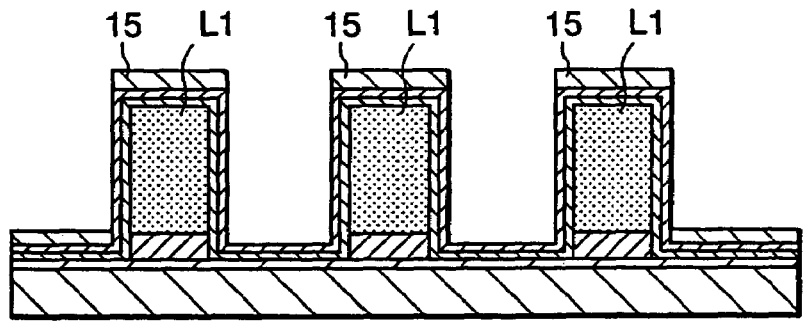
Figure 45C:
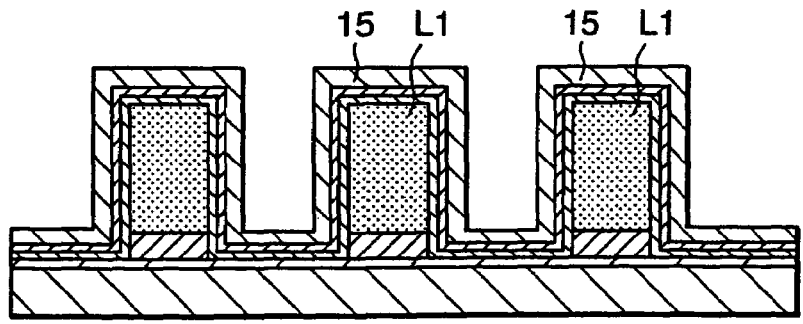
Figure 46:
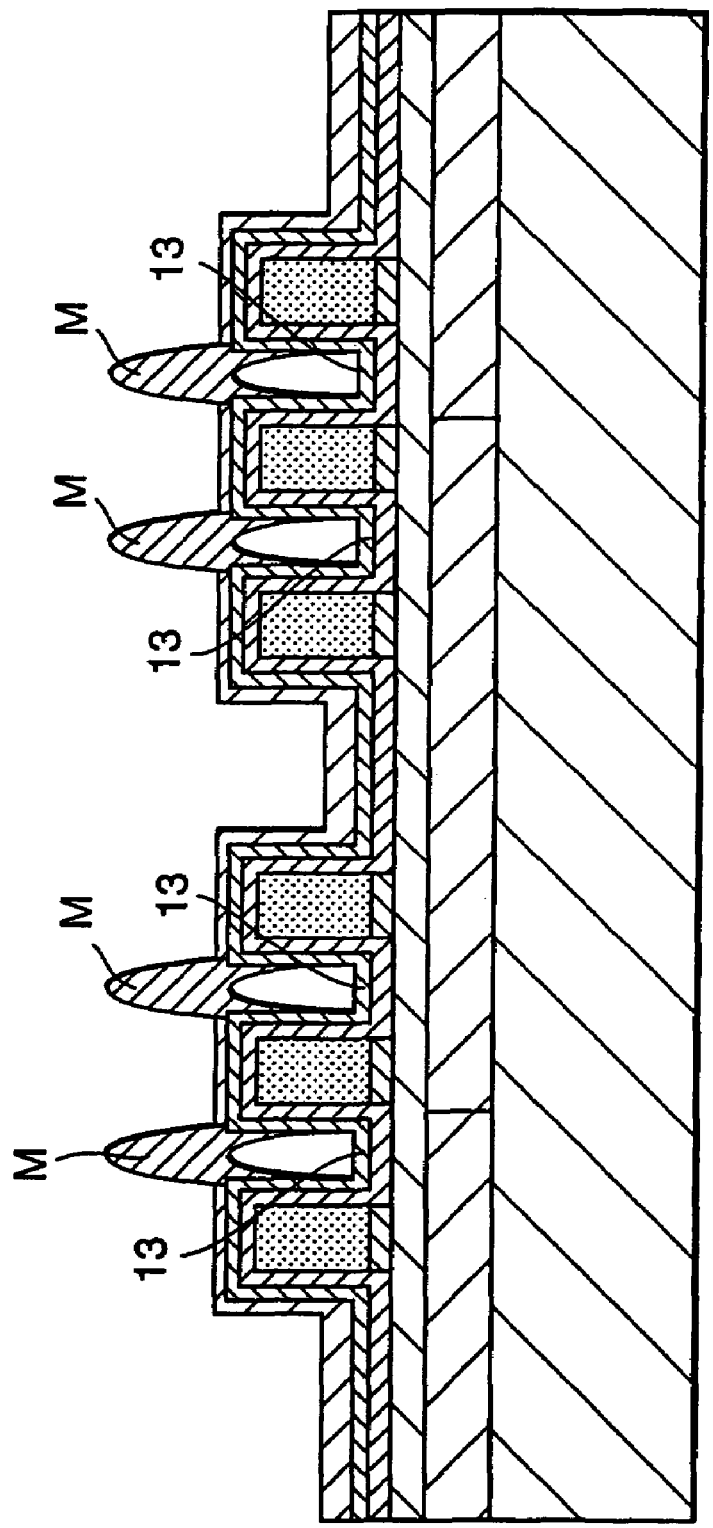
FIG. 46 is a schematic view for explaining plating carried out when pattern mismatching occurs.

Onto a surface on which pattern mismatching has happened as shown in FIG. 45A, deposition is carried out, and a result is as shown in FIG. 46. To perform plating in such trenches, if several parts of the underlying conductive film 13 are left on several sidewalls, deposition M grows fast out of tops of the sidewalls closest to opposite poles, whereas deposition in the trenches grows slowly because a plating solution remains in the trenches. As a result, as shown in FIG. 46, holes may be formed within the trenches.

The only way to avoid such a problem and fill the trench completely with deposition is to grow deposition out of bottoms of the trenches. Thus, it is most preferable to remove the underlying conductive film 13, as in this embodiment, corresponding to the tops and the sidewalls of the first coil L1 beforehand.

Figure 23A:
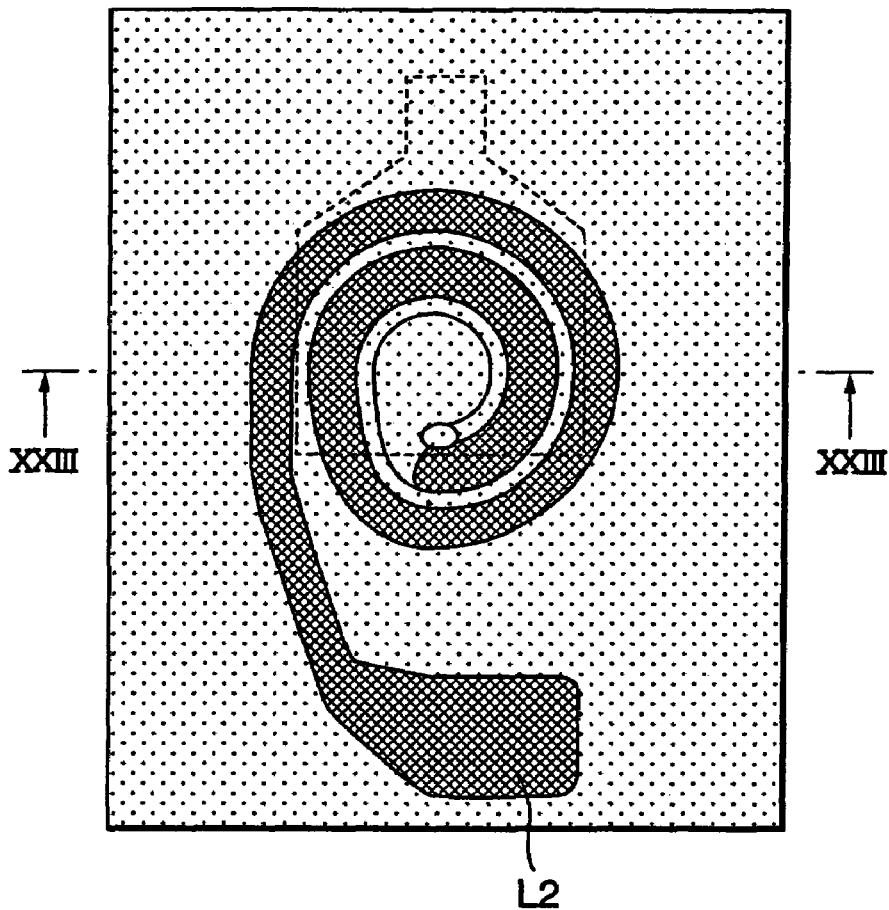
Figure 23B:
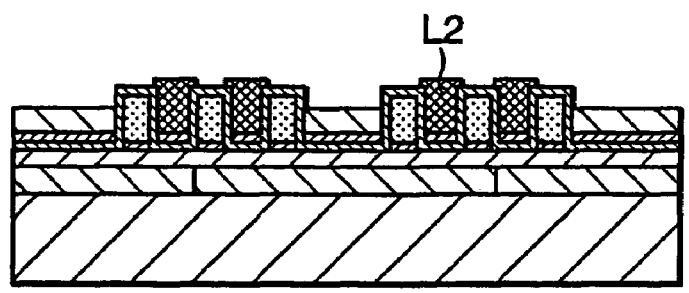

FIGS. 23A and 23B show an intermediate product where deposition according to the plating is grown in such a way described above, in which both ends of the second coil L2 have larger areas so as to allow external connection. Any size may be selected for the ends.

Figure 24A:
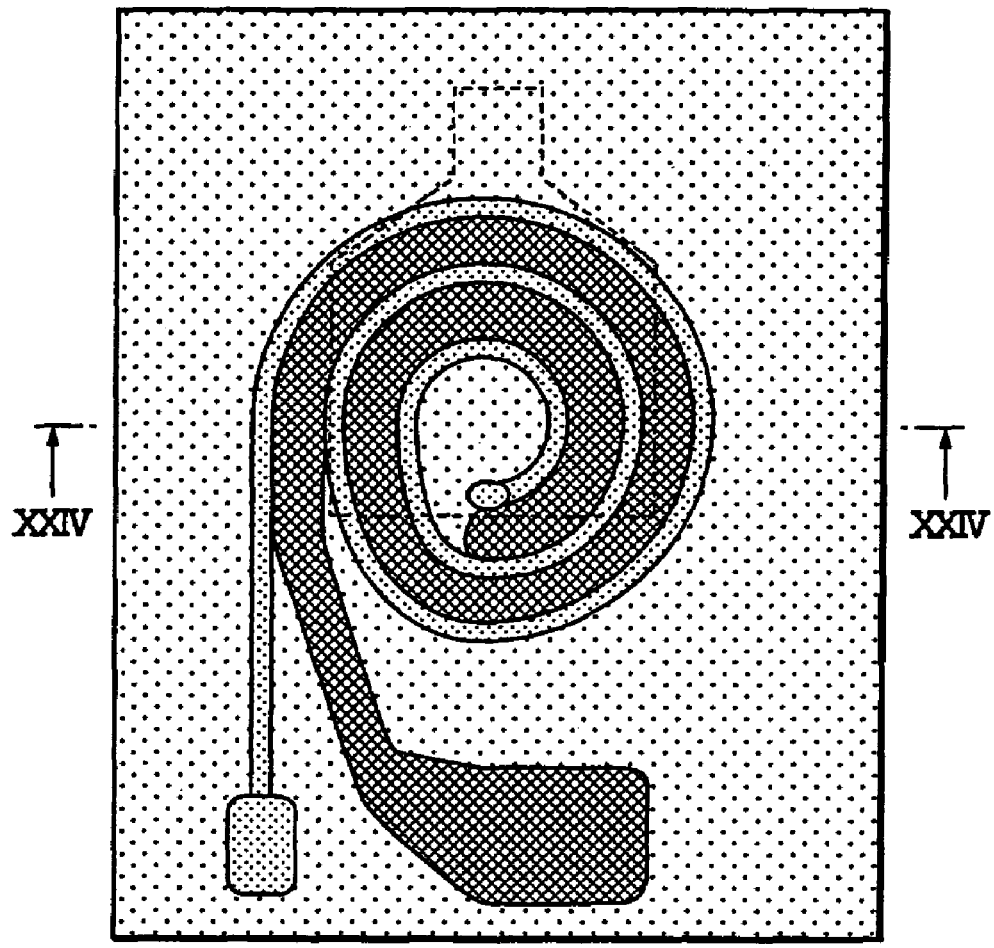
Figure 24B:
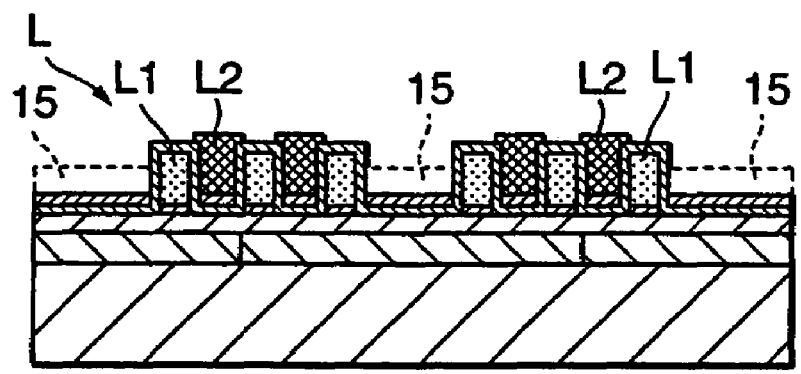

As shown in FIGS. 24A and 24B, the resist film 15 coated for plating the second coil L2 is dissolved and removed by an organic solution, thereby providing a thin-film coil L where the second coil L2 is interposed between winding portions of the first coil L1 and the first and second coils are on substantially the same plane.

Figure 25A:
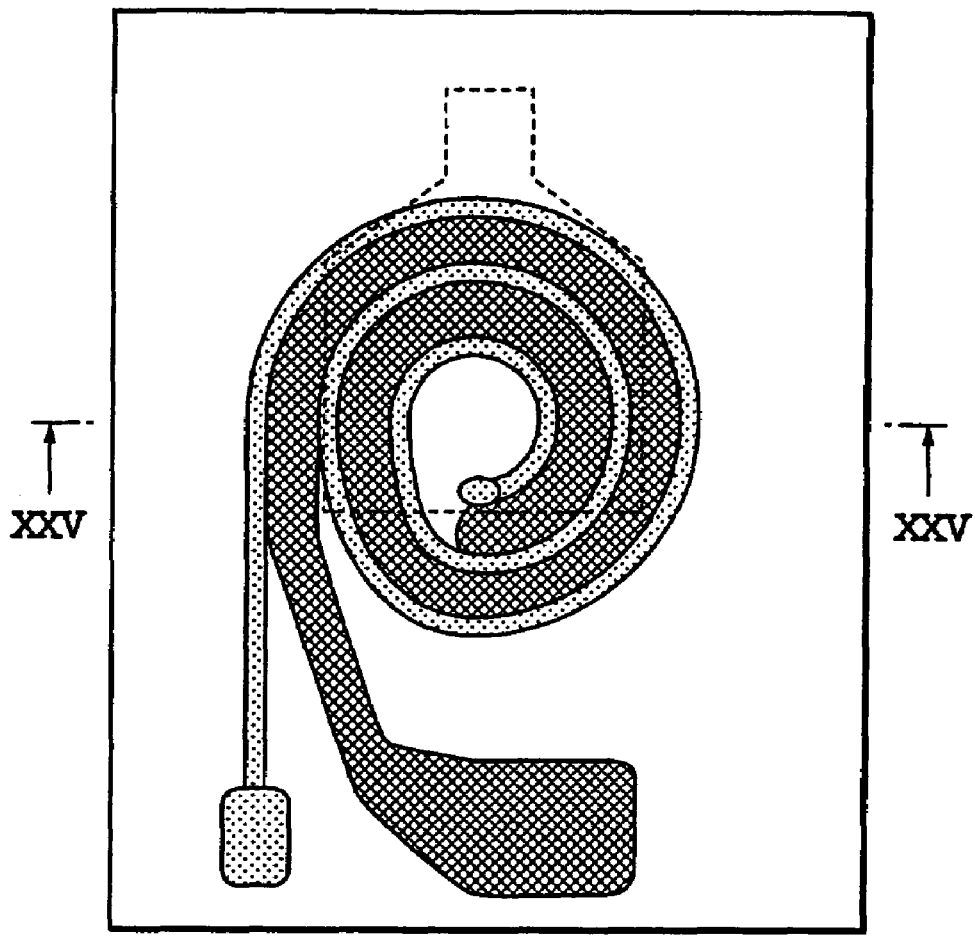
Figure 25B:
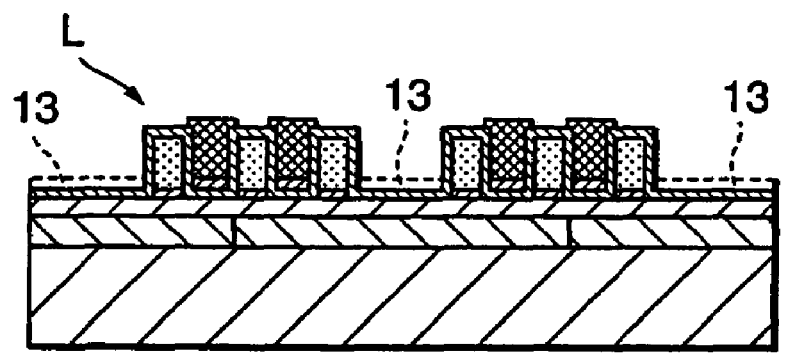

As shown in FIGS. 25A and 25B, the underlying conductive film 13 remaining at a periphery of the thin-film coil L is removed by means of an ion etching process. The ion etching process does not have to be set to a particular angle or so because no underlying conductive film exists at small portions or hidden portions.

Figure 26A:
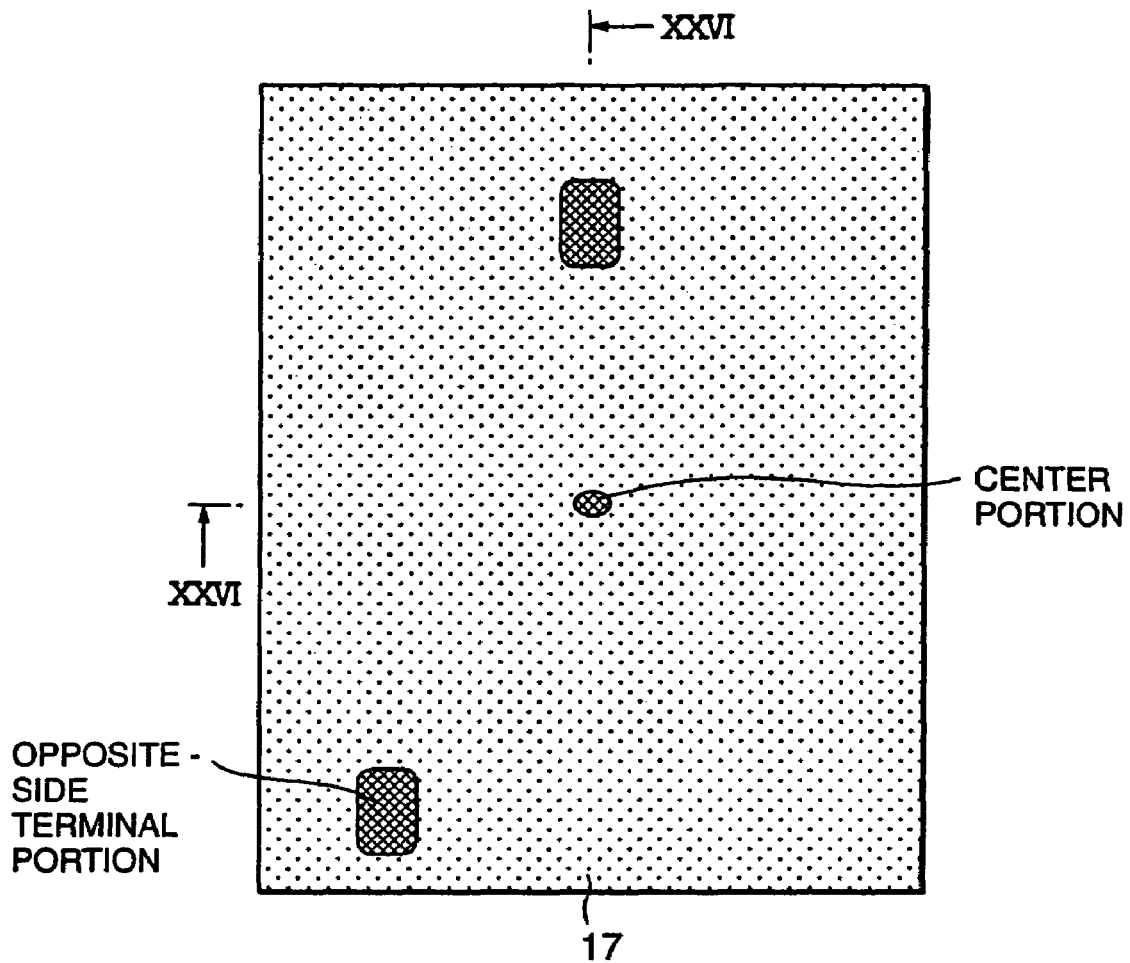
Figure 26B:
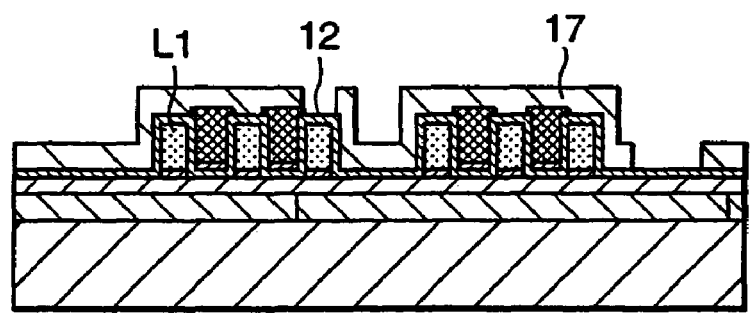

As shown in FIGS. 26A and 26B, in order to remove the insulating film 12 deposited on both ends of the first coil L1 and on a front gap portion to form a magnetic core, a resist film 17 having openings corresponding to both the ends and the front gap portion is patterned by means of a photolithographic process.

As to the front gap portion, the resist film 17 is patterned to obtain an opening at a portion corresponding to a distal end of a magnetic core. Any shape may be selected for both ends of the first coil L1 as long as they are large enough to be connected. In this embodiment, an opening at the center portion is a circle with a radius of 5 μm and an opposite-side terminal portion is a rectangle with edges of about 20 μm.

After completion of patterning, the exposed insulating film 12 is removed by an ion etching process or a wet etching process. In this embodiment, the exposed insulating film 12 is removed by means of the wet etching process then by means of the ion etching as well in order to clean its surface. Any removing process may apply to the removal of the film.

Figure 27A:
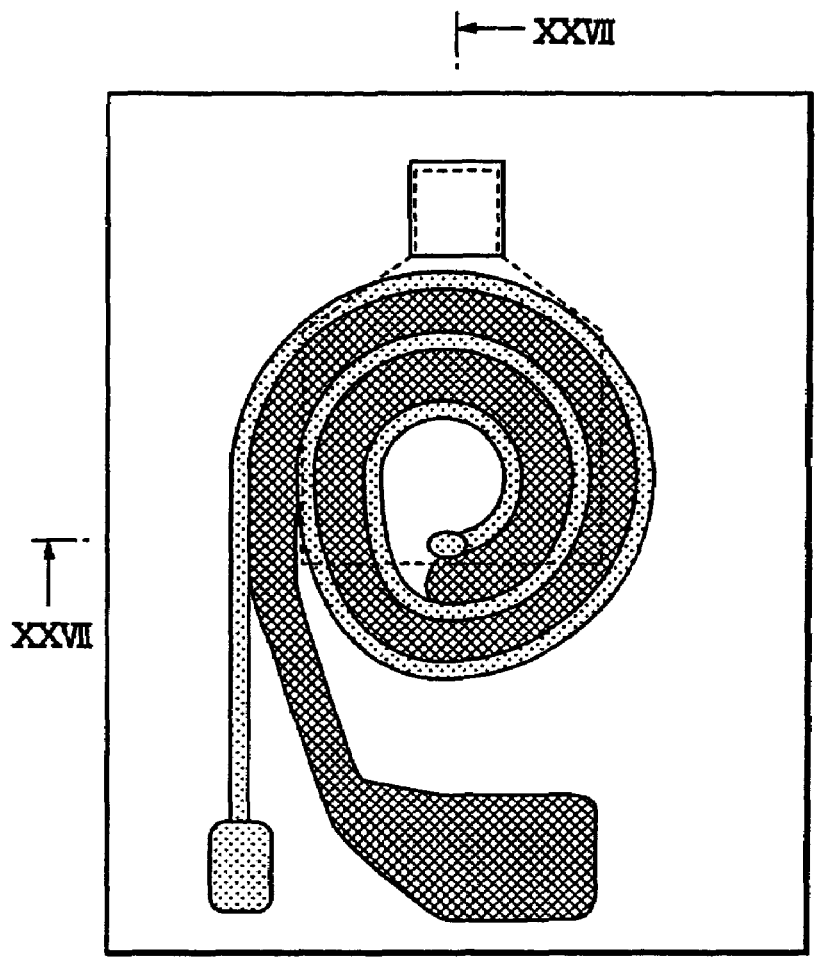
Figure 27B:
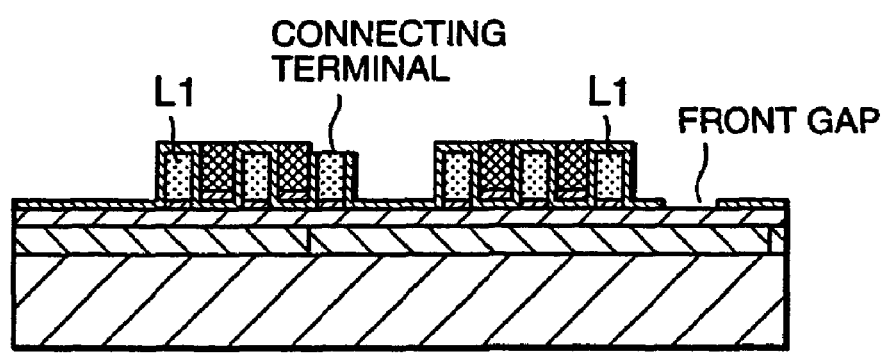

After removal of the exposed insulating film 12, the patterned resist film 17 is dissolved and removed by an organic solvent, resulting in a status as shown in FIGS. 27A and 27B. Both the ends of the first coil L1 are exposed by the process.

Figure 28A:
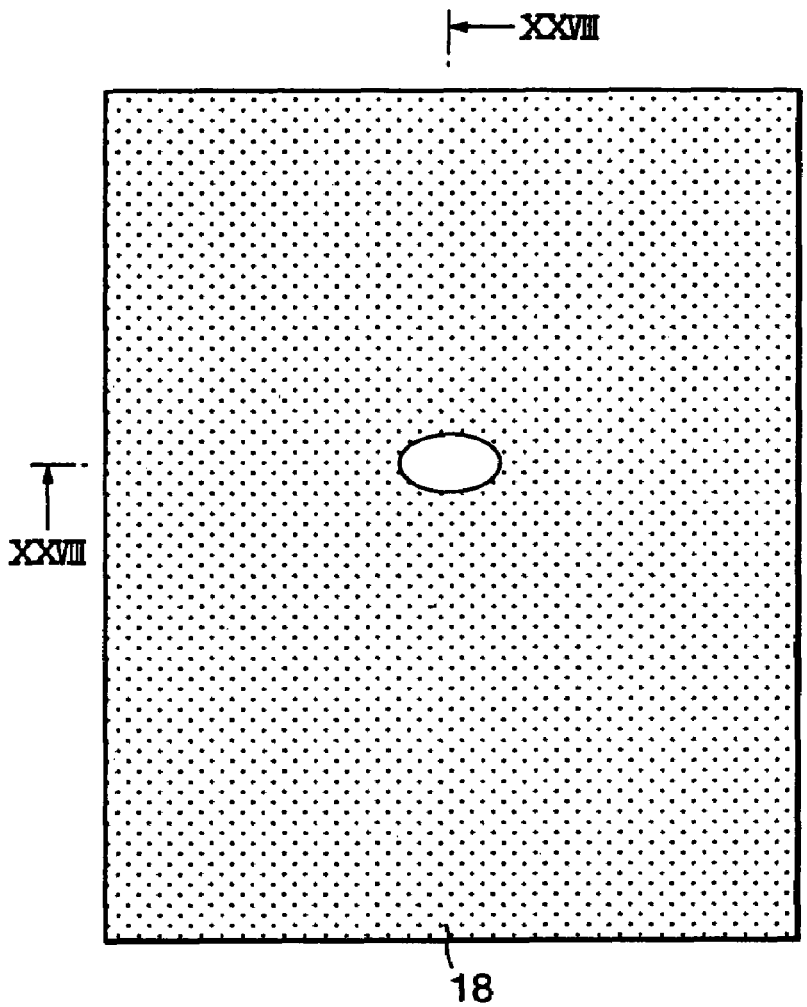
Figure 28B:
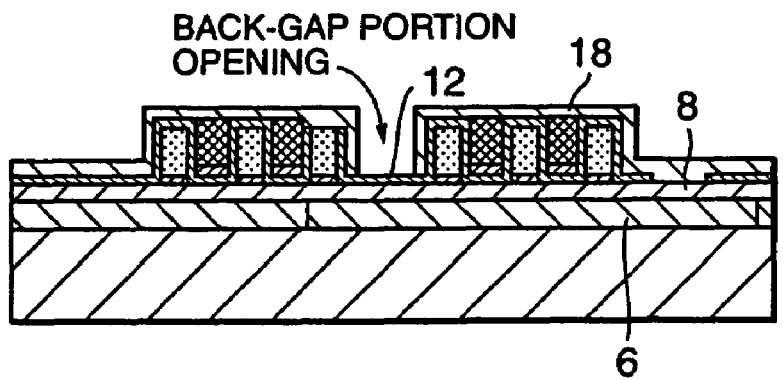

As shown in FIGS. 28A and 28B, a resist film 18 having an opening of a back gap portion is formed by a photolithographic process. The front gap portion is connected to an upper-layer core (not shown) via a gap material, and the back gap portion is directly connected to the upper-layer core. With a conventional process, there are the gap film 8 and the insulating film 12 at the back gap portion. Accordingly, these non-magnetic films must be removed before forming the upper-layer core.

Figure 29A:
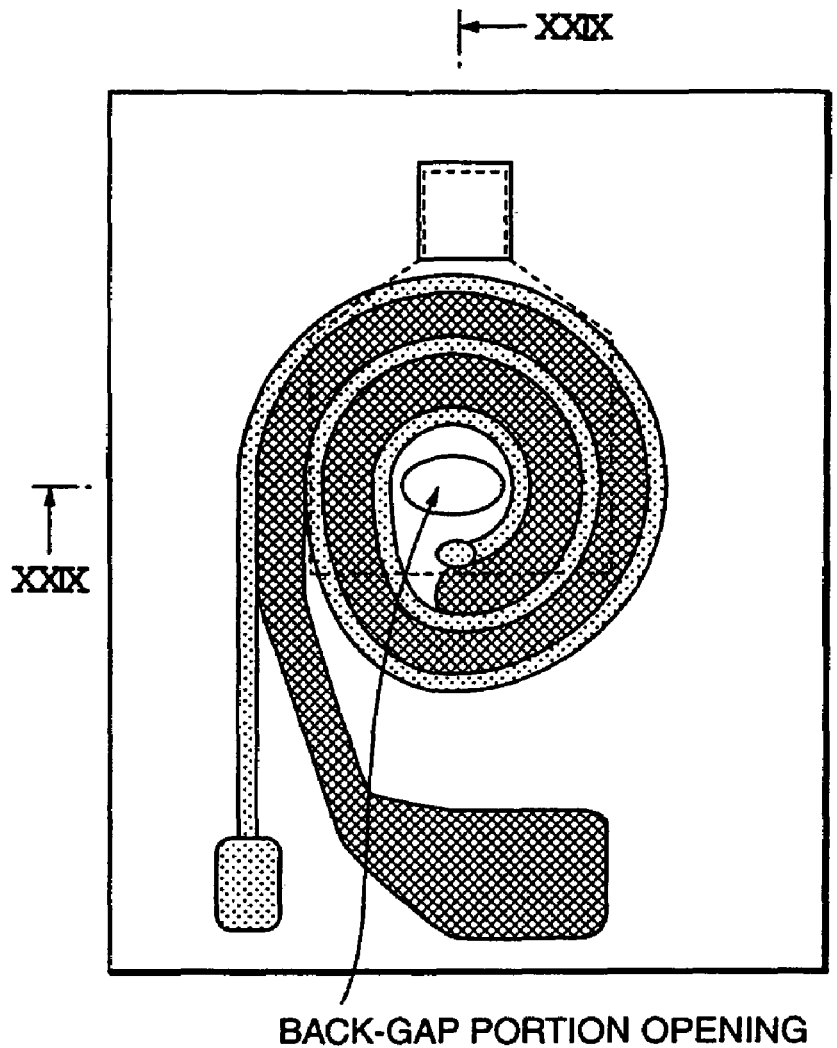
Figure 29B:
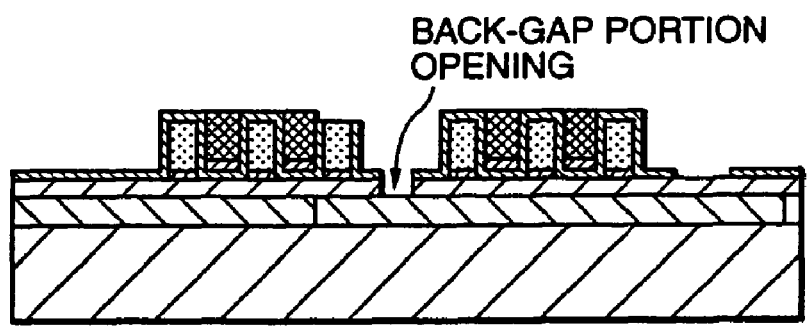

As shown in FIGS. 29A and 29B, in order to remove the non-magnetic films at the back gap portion, the gap film 8 and the insulating film 12 located at the opening of the resist film 18 (see FIGS. 28A and 28B) is removed by means of an ion etching process or a wet etching process.

As described above, any removing process may be used. Any shape may be applied to the back gap portion, however, it is preferable to bring the back gap portion as close as possible to the front gap portion and to make it as large as possible in order to have higher recording efficiency. In this embodiment, the back gap portion is in the shape of an ellipse with a transverse axis of 25 μm and a conjugate axis of 10 μm, whereby the back gap portion of the lower-layer core 6 is exposed.

Figure 30A:
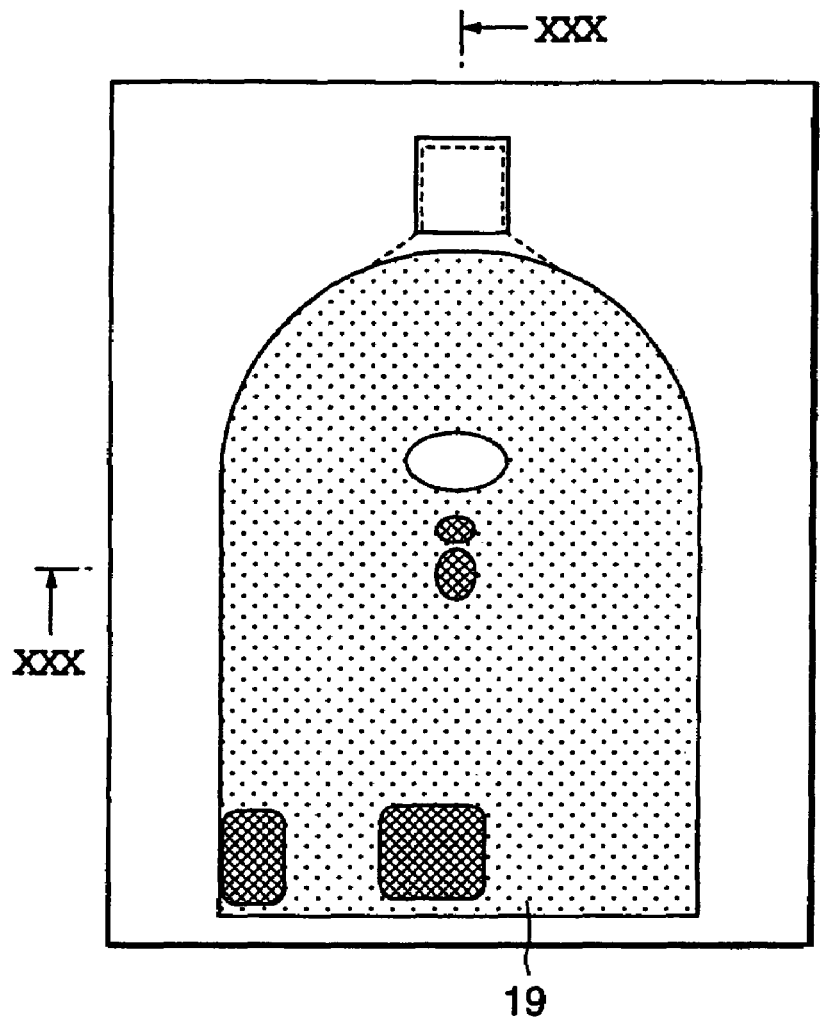
Figure 30B:
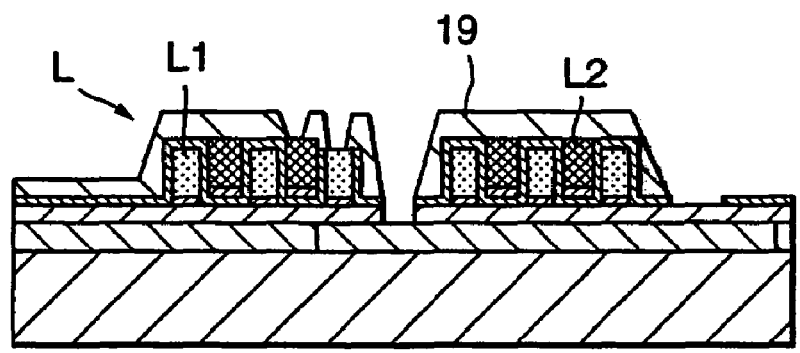

As shown in FIGS. 30A and 30B, in order to isolate the thin-film coil L from outside air and to provide insulation between the thin-film coil L and the upper-layer core to be formed later, a resist film 19 for planarization is patterned by means of a photolithographic process so as to cover the whole of the thin-film coil L.

At this point, as shown in FIGS. 30A and 30B, the resist film 19 has a pattern in which any resist film remains at neither the back gap portion nor any end of the first coil L1 and the second coil L2. Any type of the resist film 19 for planarization or any method for manufacturing the same may be applicable. After completion of patterning, the substrate, as it is, is heated at about 300° C. for about 1 hour, whereby the resist film 19 is hardened and becomes insoluble even in an organic solvent.

Figure 31A:
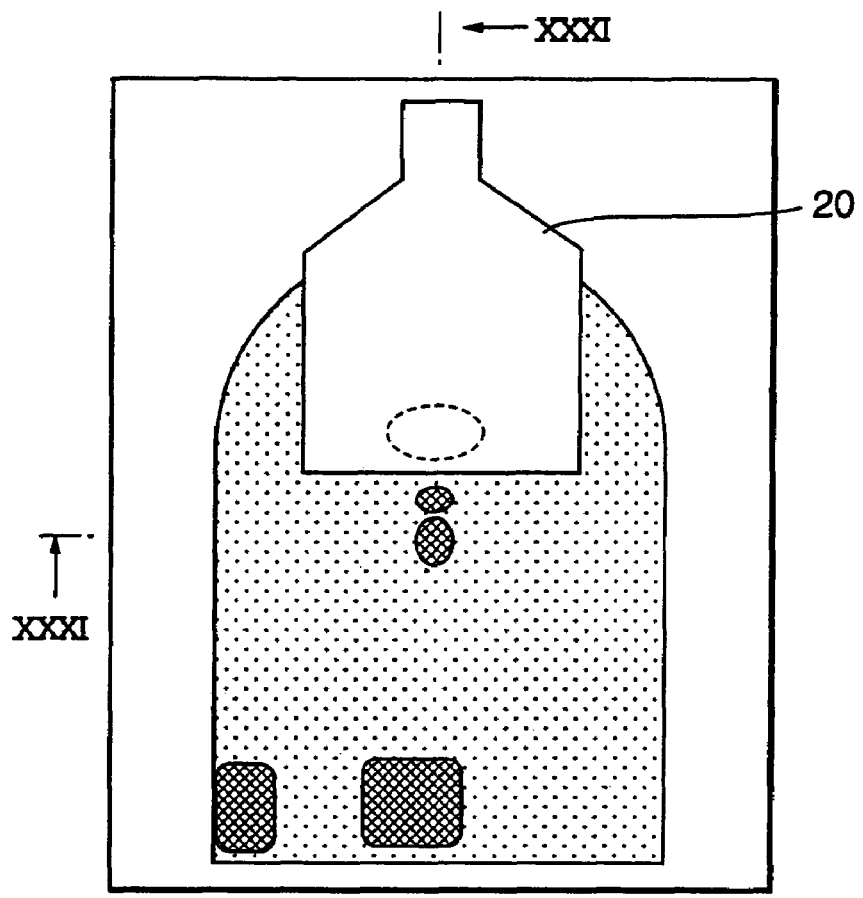
Figure 31B:
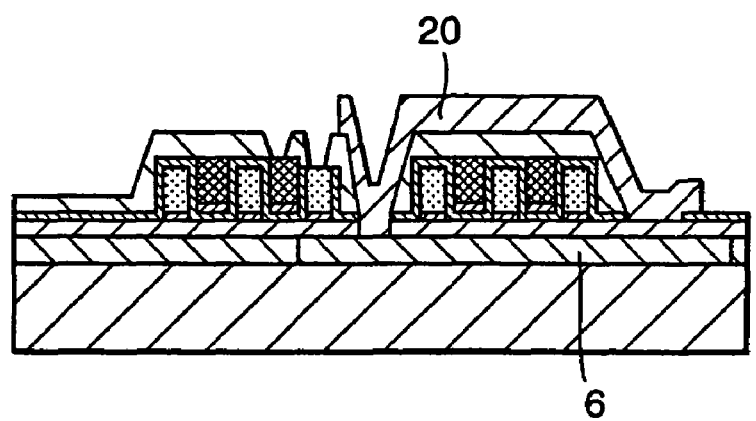

Then, as shown in FIGS. 31A and 31B, the upper-layer core 20 is formed. Any process may be applied to forming the upper-layer core 20. For example, a layer of Ni, Fe or the like to be the upper-layer core 20 may be formed by means of sputtering or plating, and coated with a resist film of a desired pattern, and undesirable portions may be removed by means of an etching process; or the layer may be patterned with a resist film having openings of desired shape then a plating process may be carried out, whereby an upper-layer core of a desired shape may be obtained.

As to materials for the upper-layer core 20, any material of sufficient soft-magnetic characteristic may be used. Considering recording efficiency, it is preferable to use a material having higher magnetic permeability and higher saturation magnetic-flux density as long as possible. In this embodiment, a plating film of Ni/Fe is used. Any shape is applicable to the upper-layer core 20. A transverse width of a magnetization pattern, that is a track width, is determined by a transverse width of the front gap which is a width of the lower-layer core 6 or that of the upper-layer core 20, whichever is narrower.

Further, the back gap portion is also covered with the upper-layer core 20. In this embodiment, a thickness of the upper-layer core 20 is selected to 2.5 μm, because the upper-layer core 20 needs to have sufficient volume not to saturate recording magnetization intensity.

Figure 32A:
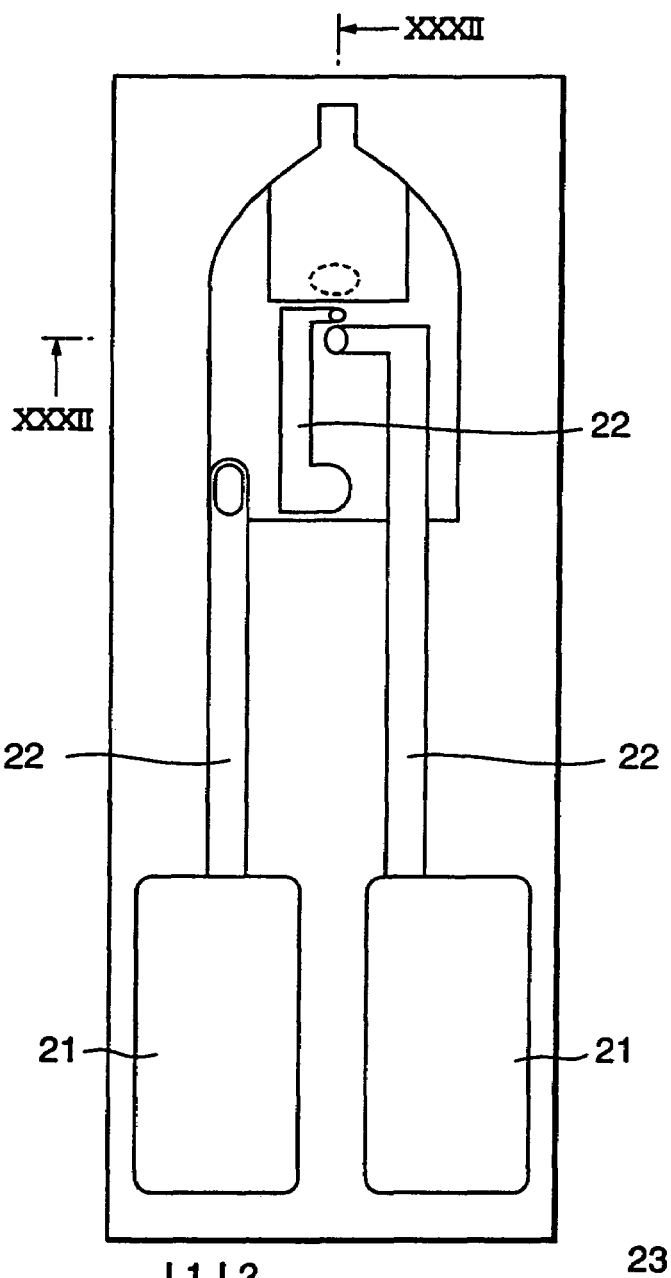
Figure 32B:
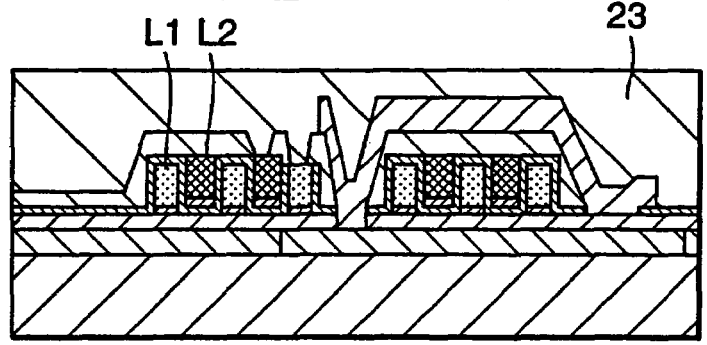

As shown in FIGS. 32A and 32B, the first coil L1 and the second coil L2 are connected with each other and terminals are formed to allow external connection. An end of the first coil L1 and an end of the second coil L2 are connected by a coil connecting lead 22 as shown in FIG. 32A so that the thin-film coil becomes electrically conductive.

An external connecting terminal 21 is formed at each end of the first and second coils in order to have an electrical connection with an external device. Although each coil connecting lead 22 may have any size or any shape, it is preferable to allow the terminal to have as large a surface area as possible in order to decrease its resistance.

Any process is applicable to the forming of the coil connecting lead 22. In this embodiment, similar to the forming of the above-mentioned magnetic cores (the upper-layer core and the lower-layer core), a resist film having openings in a desired shape is patterned by means of a photolithographic process beforehand, then an electroplating process is carried out in a copper sulfate solution for plating so as to grow Cu plating at desired portions. The plating solution is not limited to the copper sulfate solution. Any material to be plated may be used as far as the material is electrically conductive.

Further, another plating process is applied only to the external connecting terminal portion so as to obtain a thickness of about 20 μm. This portion is exposed even after the subsequent process so as to have an electrical connection with an external device.

Rugged portions formed on the substrate (wafer) due to various patterns used in previous processes are smoothed or planarized. In this embodiment, an Al$_2$O$_3$ film with a thickness of about 20 μm is sputtered on the whole surface of the wafer, the surface is ground by means of a mechanical polishing process in order to smooth the surface. The Al$_2$O$_3$ film functions as an embedding layer 23 for planarization and the thin-film coil L and a magnetic core element are embedded in the embedding layer 23 as shown in FIG. 32B.

As described above, element forming processes are completed by means of thin-film processes. Hereafter, mechanical processes are carried out so as to build a magnetic head in a system.

As shown in FIG. 33, magnetic head elements where the thin-film coil L are formed are cut out of the substrate (wafer) into blocks of a few elements in a unit. Although a cut block 24 is obtained every five elements, as shown in FIG. 33, any number of elements per block may be selected.

Figure 34:
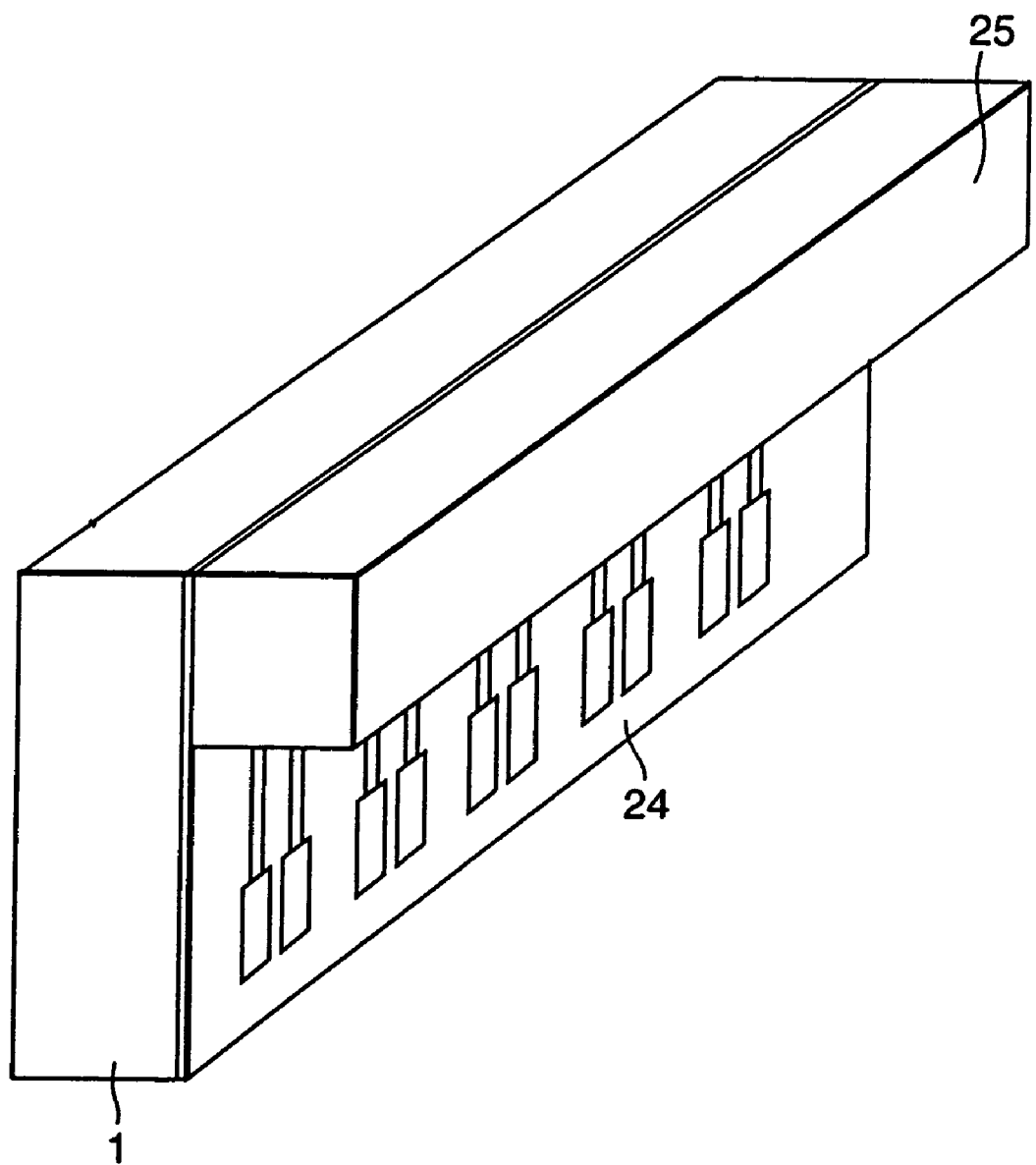
FIG. 34 is a schematic view (No. 29) for explaining a manufacturing process.

As shown in FIG. 34, a bonding substrate 25 to protect the magnetic head elements is bonded to the cut block 24. In this embodiment, a material for the bonding substrate 25 is the same as that of the substrate 1, however, any material may be used. The bonding substrate 25 needs to be smaller in size than the cut block 24 in order that the external connecting terminals of the magnetic head elements that are formed on the substrate 1 may be exposed. The bonding may be performed by using resin adhesives.

Figure 35:
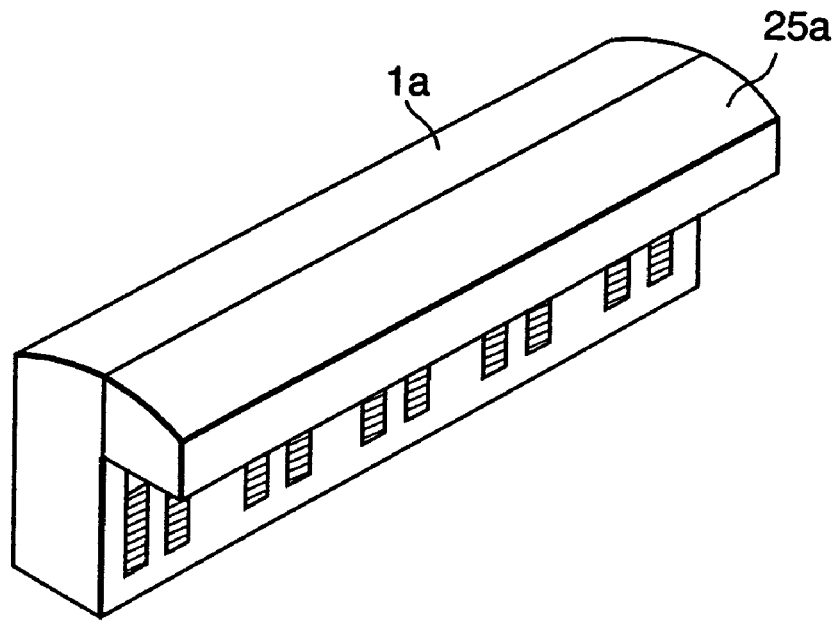
FIG. 35 is a schematic view (No. 30) for explaining a manufacturing process.

As shown in FIG. 35, a surface to be the upper surfaces 1a and 25a (which slide on magnetic tape) of the bonded block are finished in the shape of an arc so as to conveniently fit on magnetic tape. Shapes of such surfaces depend on systems to be used, and so will not be described in any further detail.

Figure 36:
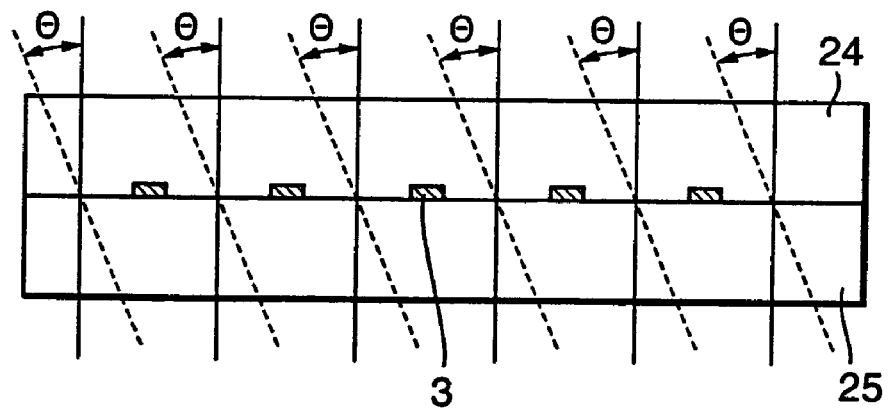
FIG. 36 is a schematic view (No. 31) for explaining a manufacturing process.

Finally, as shown in FIG. 36, a series of magnetic heads located on the cut block 24, where a plurality of MR elements 3 are aligned, and on the bonded substrate 25 are divided into magnetic heads to be used. In this step, if the magnetic head is applied to a system using azimuth recording, cutting may be carried out with a desired azimuth angle θ. As described above, the magnetic head (see FIG. 3) using the thin-film coil in accordance with the present embodiment is completed.

Figure 37:
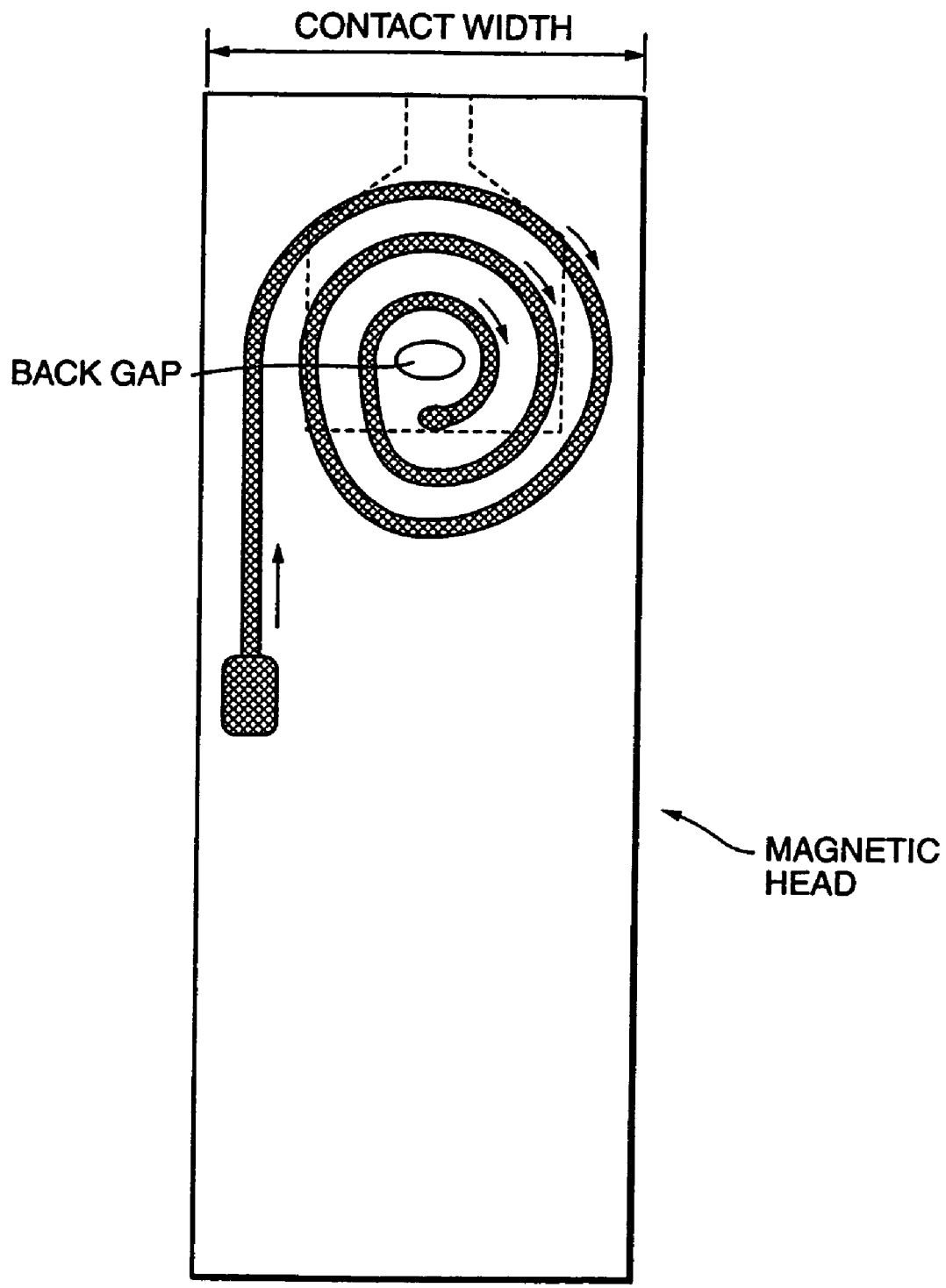
FIG. 37 is a schematic cross-sectional view showing a magnetic head.

Now, an easy patterning by the manufacturing processes will be described in accordance with this embodiment. A magnetic head to be installed in a rotary drum for a helical scanning system will be described as an example. FIG. 37 is a schematic cross-sectional view showing an exemplary magnetic head. As to the exemplary magnetic head, a width of the magnetic head body, that is a width in slide-contact with a magnetic tape, is referred hereafter to as "contact width". The contact width is defined by a system. The width may be no more than about 100 μm, for example.

In other words, the winding portions of a recording head need to be accommodated within the contact width so that a thin-film coil should be of high space factor. A conventional MIG (Metal In Gap) head has a winding portion using copper wire in which its total resistance is about 3 Ω. Considering employing an electric circuit in combination with the magnetic head in an apparatus, a required total resistance for the thin-film coil is preferably no more than about 3 Ω.

It may be necessary to increase a number of winding somewhat so as to generate a high writing magnetic field with a high frequency and a small current, which is applicable to a recording media having a high coercive force.

Including above requirements, a specification for a magnetic head in accordance with the present embodiment should at least request that a number of winding be no less than 10 turns, a total resistance be no more than 3 Ω. and a contact width be no more than 100 μm.

Now, in order to form a thin-film coil, it is necessary to form a resist film having openings corresponding to a shape of the thin-film coil and then to perform plating. In other words, density of the thin-film coil is determined by a width of the resist film formed between coils.

As described above, if a height of the thin-film coil is to be increased in order to decrease a resistance, it is necessary to use a resist film and an exposure system which provide a high aspect ratio. A conventional stepper exposure system using g-ray and i-ray, unless it is of a high accuracy, provides at most an aspect ratio of 6 μm for a width of 2 μm of a resist film pattern.

As to an area where winding is provided, considering that winding is provided so as to turn around a back gap, of a magnetic core, having a width of about 16 μm and so as to be within a contact width and that each margin for working should be no more than 10 μm from each end, the winding area is calculated as follows:

$$\begin{aligned}\text{Winding Area} &= (\text{Contact Width} - \text{Back Gap} - \text{Left \& Right Margins})/2 \\ &= (100\ \mu m - 16\ \mu m - 10\ \mu m \times 2)/2 \\ &= 32\ \mu m\end{aligned}$$

Thus, the winding should be provided within 32 μm.

Figure 38:
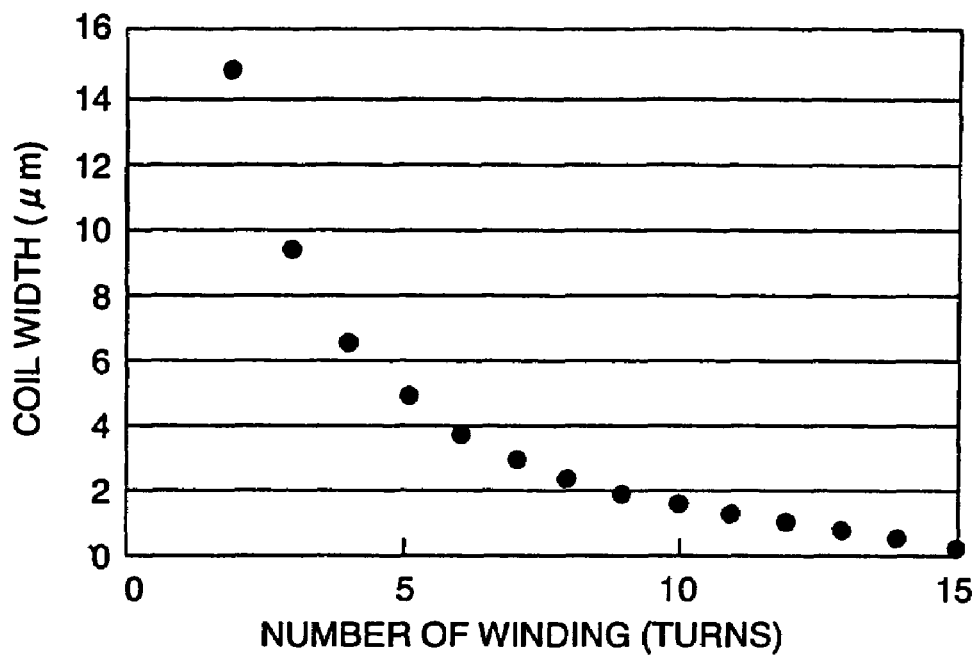
FIG. 38 is a graph showing a coil width to a number of winding in a case where a thin-film is formed by means of a conventional forming process.
Figure 39:
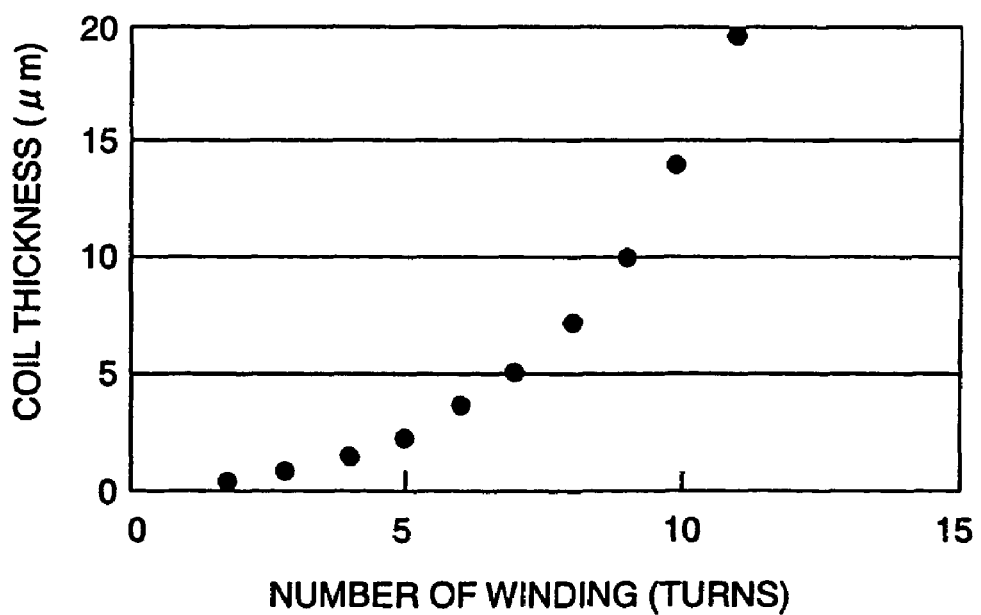
FIG. 39 is a graph showing a coil thickness to a number of winding where resistance is set to 3 Ω in a case where a thin-film is formed by means of a conventional forming process.

FIG. 38 is a graph showing a coil width to a number of winding in case a thin-film is formed by means of a resist film in accordance with a conventional forming process, and FIG. 39 is a graph showing a coil thickness to a number of winding where resistance is set to 3 Ω. Each width of resist film patterns is set to 2 μm which is generally a minimum width.

Referring to the graphs, when ten turns are provided in a one-layered thin-film coil in accordance with a conventional process, a width of one turn of the coil may be about 1.5 μm. If copper plating has a specific resistance of 2.2 μΩ·cm, the width of one turn exceeds 12 μm in order to have a total resistance of 3 Ω for the thin film coil and no coils can be formed.

Figure 40:
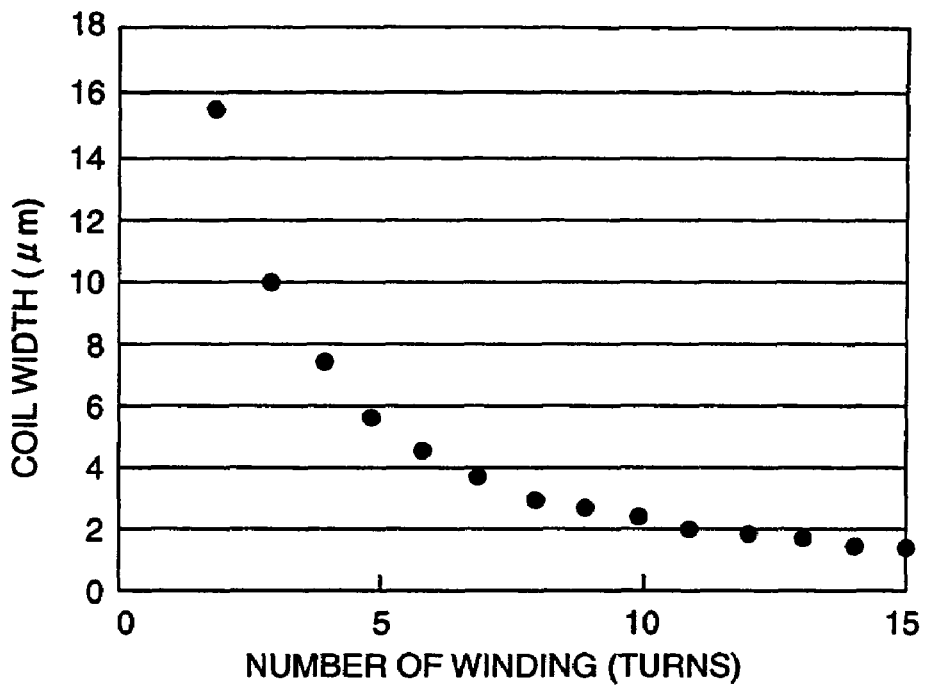
FIG. 40 is a graph showing a coil width to a number of winding in a case where a thin-film coil is formed by a process in accordance with the present embodiment.
Figure 41:
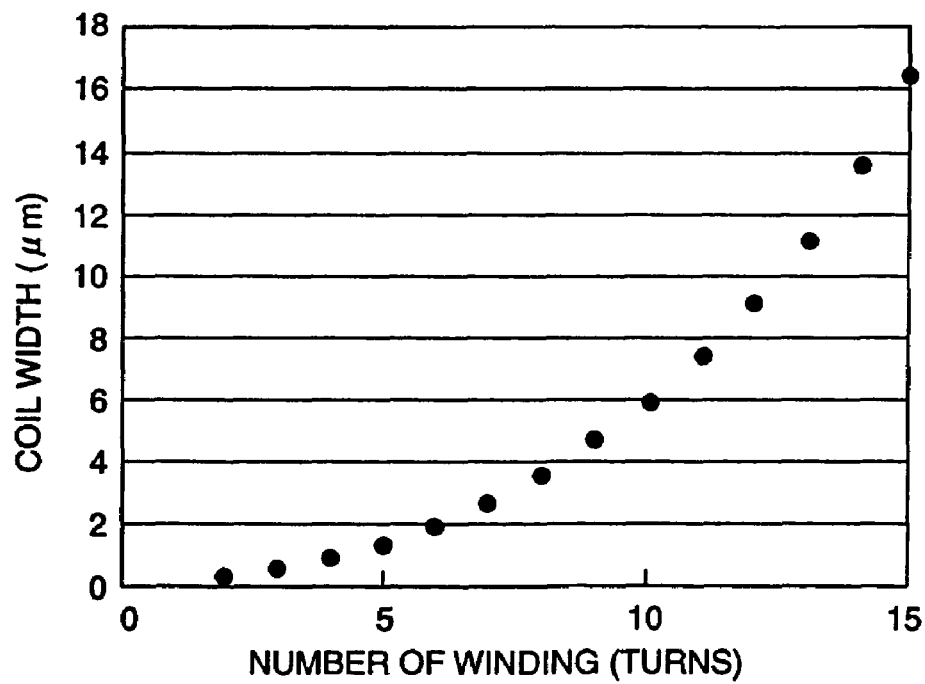
FIG. 41 is a graph showing a coil thickness to a number of winding in a case where resistance is set to 3 Ω in accordance with the present embodiment.
Figure 42A:
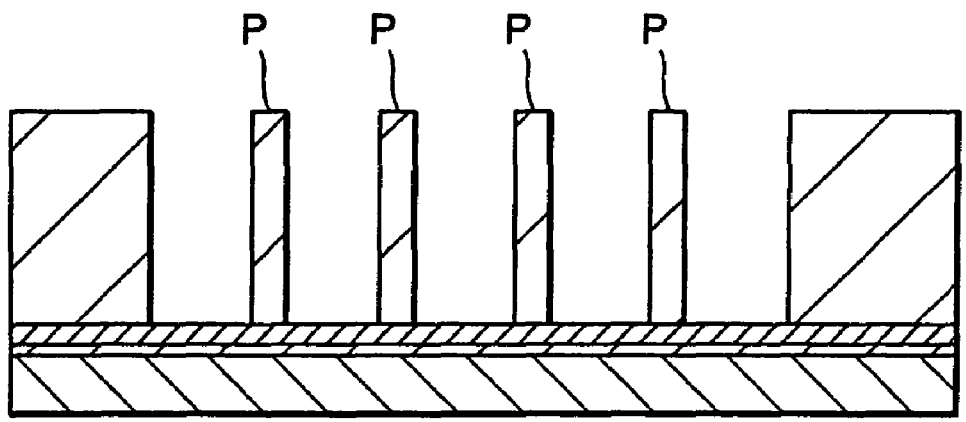
FIGS. 42A and 42B are schematic views for explaining a conventional manufacturing process.
Figure 42B:
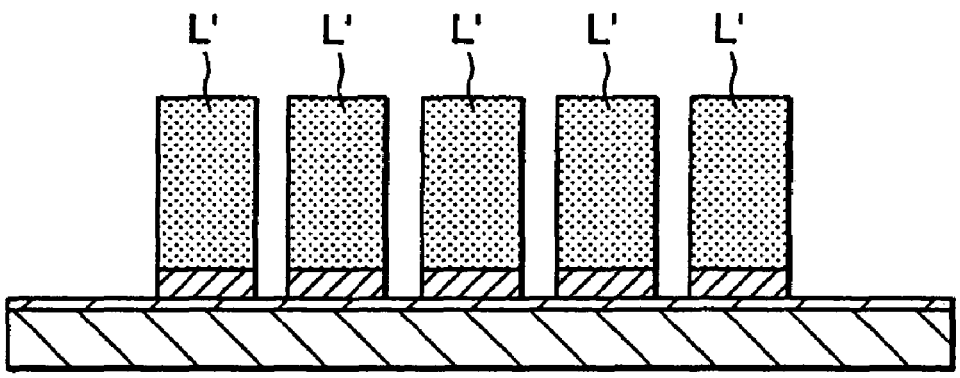
Figure 43B:
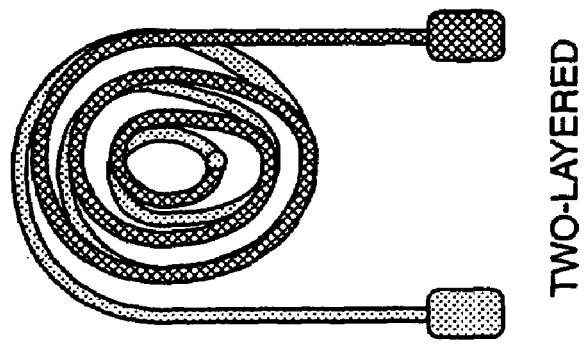
Figure 43A:
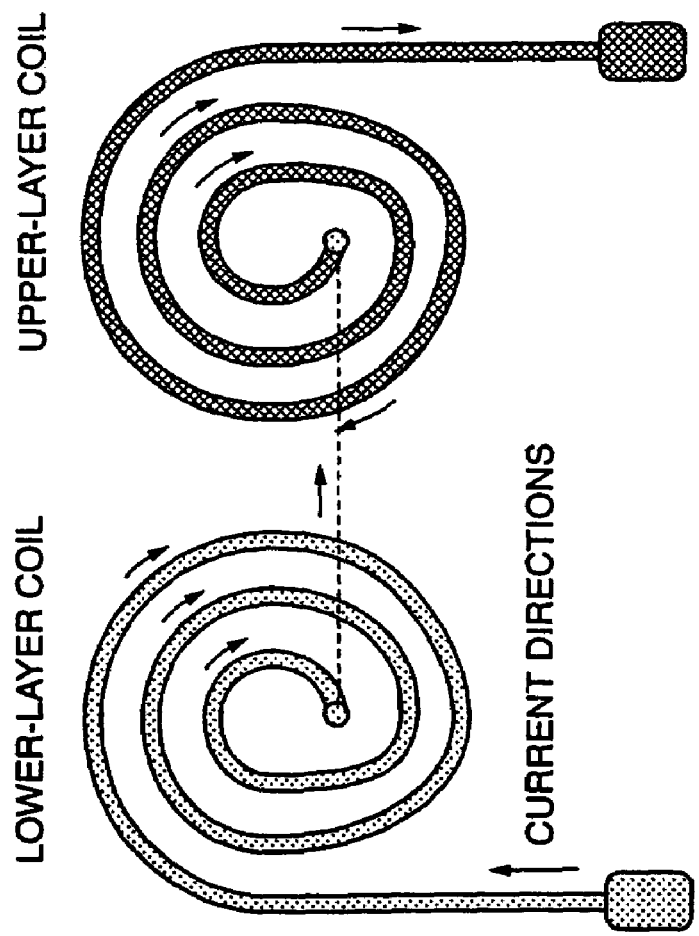

In contrast, FIG. 40 is a graph showing a coil width to a number of winding where a thin-film coil is formed by a process in accordance with the present embodiment, and FIG. 41 is a graph showing a coil thickness to a number of winding where resistance is set to 3 Ω in accordance with the present embodiment.

In this embodiment, a thickness of the insulating film between thin-film coils is defined by sputtering, resulting in an accurate thickness as close as to its target. The space between the thin film coils is no more than 1 μm so that very high space factor is provided. In the embodiment, a thickness of a thin-film coil is about 6 μm for ten turns in order to allow a total resistance of 3 Ω for the thin-film coil.

Further, in a process of manufacturing a thin-film coil in accordance with this embodiment, a second coil is formed between winding portions of a first coil. Since a pattern of a resist film has pattern portions which are located at every other winding portion, the pattern portions may have a width of 4.3 μm and a height (thickness) of 7 μm when forming the first coil. Such patterning is easily accomplished in accordance with the embodiment.

With the present embodiment, a magnetic head which meets the specification described above may be produced with a good degree of accuracy without using an accurate exposure system.

Although the invention has been described in its preferred form with a certain degree of particularity, obviously many changes and variations are possible therein. It is therefore to be understood that the present invention may be practiced otherwise than as specifically described herein without departing from the scope and the spirit thereof.

What is claimed is:

1. A method of manufacturing a thin-film coil in which a first coil and a second coil each having a desired number of windings are electrically connected in series and the second coil is formed between winding portions of the first coil on substantially the same plane, comprising:

forming the first coil having a predetermined number of windings with top and side walls, via a first insulating film;

forming a second insulating film on a surface of the first coil and between the winding portions of the first coil;

forming an underlying conductive film on the second insulating film, and removing portions of the underlying conductive film from top portions and side wall portions of the second insulating film so as to leave only bottom portions of the underlying conductive film between the winding portions of the first coil and not along the top and side walls of the first coil; and growing a deposition of material originating from a remaining portion of the underlying conductive film on the bottom portions of the underlying conducting film between the winding portions of the first coil so as to form the second coil.

2. The method of manufacturing a thin-film coil according to claim 1, wherein the second coil is formed by deposition by an electroplating process.

3. The method of manufacturing a thin-film coil according to claim 1, wherein the step of forming the underlying conductive film so as to leave only the bottom portions between the winding portions of the first coil is carried out by means of an ion etching process with a predetermined angle.

4. The method of manufacturing a thin-film coil according to claim 1, wherein the step of forming the underlying conductive film so as to leave only the bottom portions between the winding portions of the first coil is carried out by means of a wet etching process.

5. The method of manufacturing a tin-film coil according to claim 1, wherein the second insulating film between the first coil and the second coil is formed by one of a sputtering process and a vapor deposition process.

6. A method of manufacturing a magnetic head having a thin-film coil in which a first coil and a second coil each having a desired number of windings are electrically connected in series and the second coil is formed between winding portions of the first coil on substantially the same plane, comprising:

forming the first coil having top and side walls, via a first insulating film;

forming a second insulating film on a surface of the first coil and between the winding portions of the first coil;

forming an underlying conductive film on the second insulating film, and removing portions of the underlying conductive film from top portions and side wall portions of the second insulating film so as to leave only bottom portions of the underlying conductive film between the winding portions of the first coil and not along the top and side walls of the first coil; and growing a deposition of material originating from a remaining portion of the underlying conductive film on the bottom portions between the winding portions of the first coil so as to form the second coil.

7. The method of manufacturing a magnetic head according to claim 6, wherein the second coil is formed by means of an electroplating process.

8. The method of manufacturing a magnetic head according to claim 6, wherein the step of forming the underlying conductive film so as to leave only the bottom portions between the winding portions of the first coil is carried out by means of an ion etching process with a predetermined angle.

9. The method of manufacturing a magnetic head according to claim 6, wherein the step of forming the underlying conductive film so as to leave only the bottom portions between the winding portions of the first coil is carried out by means of a wet etching process.

10. The method of manufacturing a magnetic head according to claim 6, wherein the second insulating film between the first coil and the second coil is formed by one of a sputtering process and a vapor deposition process.

* * * * *